United States Patent [19]

Nameny

[11] Patent Number: 5,221,232
[45] Date of Patent: Jun. 22, 1993

[54] FLEXIBLE DISC-LIKE COUPLING ELEMENT

[75] Inventor: Frank J. Nameny, Stanchfield, Minn.

[73] Assignee: Zero-Max, Inc., Minneapolis, Minn.

[21] Appl. No.: 688,901

[22] Filed: Apr. 19, 1991

Related U.S. Application Data

[63] Continuation-in-part of Ser. No. 511,735, Apr. 20, 1990, abandoned, which is a continuation-in-part of Ser. No. 296,577, Jan. 12, 1989, abandoned.

[51] Int. Cl.$^5$ .................................. F16D 3/79
[52] U.S. Cl. .......................... 464/98; 464/99; 464/147
[58] Field of Search .............. 464/51, 69, 92–96, 464/98–100, 147

[56] References Cited

U.S. PATENT DOCUMENTS

| | | |
|---|---|---|
| 1,659,353 | 2/1928 | Dwyer . |
| 1,662,006 | 3/1928 | Kimmich . |
| 2,046,208 | 6/1936 | Paulsen et al. ............ 464/96 |
| 2,386,017 | 10/1945 | Venditty ............... 464/98 X |
| 2,630,692 | 3/1953 | Naugler . |
| 2,855,767 | 10/1958 | Ahlen . |
| 3,481,158 | 12/1969 | Mayerjak . |
| 3,625,024 | 12/1971 | Kikuchi . |
| 3,635,050 | 1/1972 | Plummer ................. 464/98 |
| 3,791,170 | 2/1974 | Schmidt . |
| 3,808,837 | 5/1974 | Anderson et al. . |
| 3,985,000 | 10/1976 | Hartz . |
| 3,987,645 | 10/1976 | Koster et al. . |
| 4,033,144 | 7/1977 | Allen . |
| 4,040,270 | 8/1977 | Chivari . |
| 4,191,030 | 3/1980 | Calistrat . |
| 4,203,304 | 5/1980 | Decker . |
| 4,282,723 | 8/1981 | Schmidt . |
| 4,317,339 | 3/1982 | Schmidt . |
| 4,321,805 | 3/1982 | Bossler, Jr. . |
| 4,331,004 | 5/1982 | Schmidt . |
| 4,353,704 | 10/1982 | Corey . |
| 4,416,645 | 11/1983 | Fredericks . |
| 4,460,345 | 7/1984 | Chivari . |
| 4,484,899 | 11/1984 | Haarmann . |
| 4,523,916 | 6/1985 | Kizler et al. ............ 464/98 |
| 4,588,388 | 5/1986 | Chivari . |
| 4,661,084 | 4/1987 | Federn . |
| 4,671,780 | 5/1987 | Weir ................. 464/100 X |
| 4,729,753 | 3/1988 | Neathery . |
| 4,776,824 | 10/1988 | Barth ................... 464/98 |
| 4,802,881 | 2/1989 | Hancock ............... 464/93 |

FOREIGN PATENT DOCUMENTS

| | | |
|---|---|---|
| 3432602A1 | 4/1985 | Fed. Rep. of Germany ...... 464/100 |
| 59-24287 | 6/1984 | Japan . |
| 236150 | 1/1969 | U.S.S.R. ................ 464/98 |
| 1500623 | 2/1978 | United Kingdom ........... 464/93 |

Primary Examiner—Daniel P. Stodola
Assistant Examiner—William G. Battista, Jr.
Attorney, Agent, or Firm—Merchant, Gould, Smith, Edell, Welter & Schmidt

[57] ABSTRACT

A flexible disc-like coupling element is provided for use in a flexible coupling which joins a driving shaft to a driven shaft of a drive train apparatus. The disc-like coupling element includes a substantially arcuate shaped hub portion at least partially defining and at least partially surrounding a central aperture. The hub portion has a radial dimension as defined from the central aperture of the disc-like coupling element. The hub portion includes a structure for flexing across the radial dimension within the plane of the disc-like coupling element. The disc-like coupling element also includes a plurality of lobes spaced from the hub portion and connector portions corresponding to each lobe for connecting the corresponding lobe to the hub portion. Each lobe has a pair of substantially arcuate shaped arms joined together adjacent a corresponding connector portion. The arms extend away from one another in substantially opposite directions and terminate in free ends. The free ends of the arms having attachment mechanisms for attaching the disc-like coupling element to other elements of the drive train apparatus. The attachment mechanisms are located at a substantially identical radial distance from the central aperture of the disc-like coupling element.

32 Claims, 12 Drawing Sheets

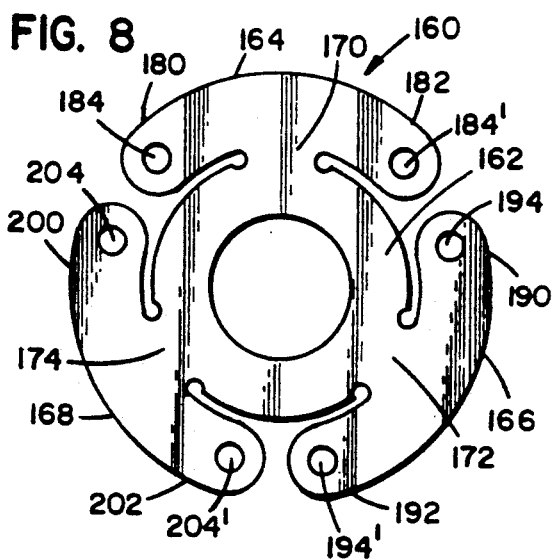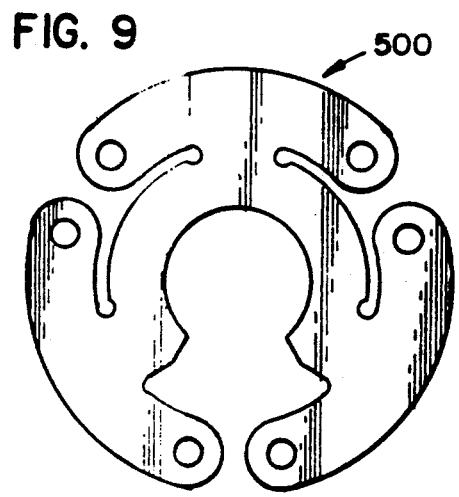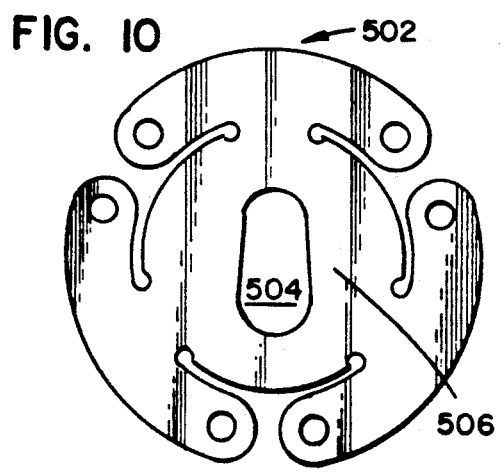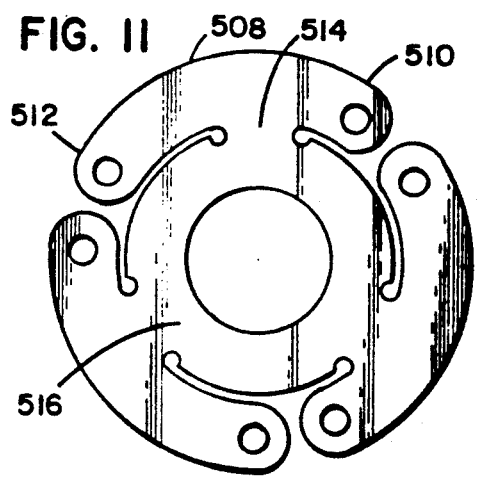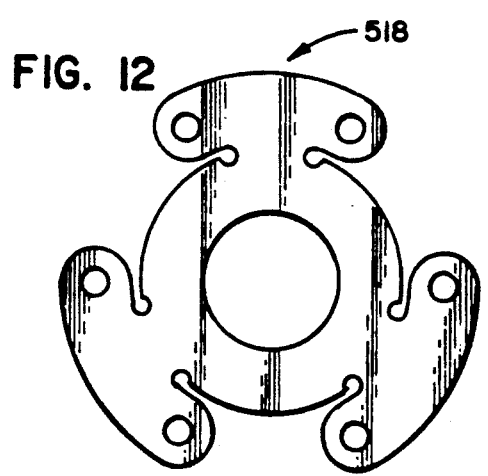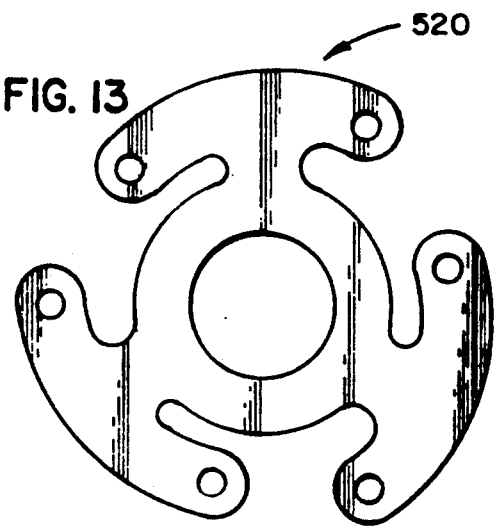

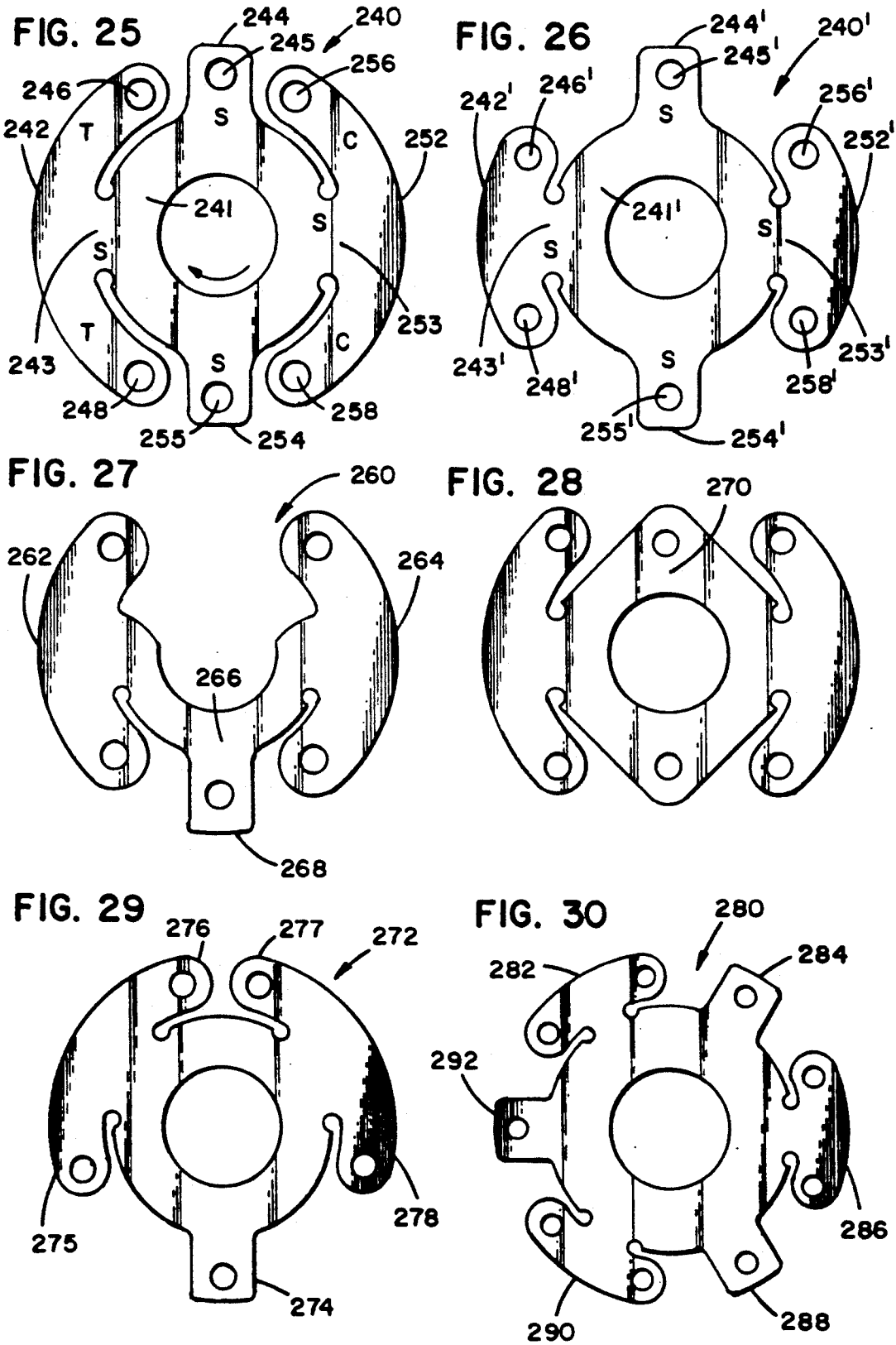

FLEXIBLE DISC-LIKE COUPLING ELEMENT

This application is a continuation-in-part of U.S. patent application Ser. No. 07/511,735, Filed Apr. 20, 1990, now abandoned, which was a continuation-in-part of U.S. patent application Ser. No. 07/296,577, Filed Jan. 12, 1989, now abandoned.

FIELD OF THE INVENTION

This invention relates in general to drive trains and to flexible couplings for joining a driving shaft to a driven shaft, which may be misaligned relative to each other. More particularly, it relates to a coupling of the type employing one or more flexible disc-like elements which allow high axial and/or angular displacement between the shafts with increased torque transfer capability.

BACKGROUND OF THE INVENTION

When the axes of rotation of a driving and a driven shaft are not in alignment, there are a number of possible categories of such misalignment. One may be considered parallel offset, that is, where the axes are parallel to each other but spaced from one another in a transaxial direction. Another may be considered angular offset, which is where the axes are not parallel but intersect at an angle, although the axes may lie in parallel planes. The third is misalignment in the axial direction.

Numerous coupling devices have been developed to transmit power from or between two such shafts. Kikuchi U.S. Pat. No. 3,625,024, which issued Dec. 7, 1971, and U.S. Pat. No. 4,321,805, which issued to Bossler, Jr. (hereinafter Bossler) on Mar. 30, 1982, disclose flexible disc couplers. In disc couplers, a flexible coupling device connects through attachment points on the coupling device to driving and driven elements of a drive train, such as rotatable shafts or hubs on such shafts, at the same radius from the center of the coupler device. Disc couplers further can be divided into closed and open arm types.

Closed disc couplings always carry torque load in tension between the attachment points of the coupling device. Closed discs, such as the Formsprag® type (Formsprag® is a registered trademark of Dana Corporation), are also well known, offer high torque transmission, but are not capable of handling severe misalignments of driving and driven shafts. Also, in prior art disc couplings, the phenomenon of "fretting" occurs. There are two types of "fretting", namely (a) nutating fretting, such as is caused by movement around a bolt bearing washer, and (b) linear fretting which occurs by the rubbing together of one disc on another away from the connection area of the disc and which generates a shearing action. As the disc material rubs, it oxidizes and disturbs the substrate, eventually propagating a fatigue crack. This is especially prevalent in prior art discs having a thickness on the order of 0.015" to 0.090". Coating on such discs may extend their life, but they also deteriorate under the rubbing action.

In contrast, open arm disc couplings carry the torque load in compression or tension depending on the direction of rotation of the coupling device. Bossler is an example of the open arm type of coupling device. Such prior art open arm disc coupling devices are limited in their torque carrying capabilities. This is true in Bossler, for example, because the arms of the Bossler coupling used to transmit torque are long and are subject to column buckling. The four Bossler arms are formed into two Vs with a single beam or column connecting the vertices of the two Vs. The column which connects the "V", is susceptible to buckling under high torque loadings. This also limits torque carrying capability.

Another type of coupling provided to transfer loads to accommodate axial misalignment or displacement between a driving and a driven shaft or displacement between a driving and a driven shaft is found in a series of the following patents: U.S. Pat. Nos. 4,282,723; 4,317,339 and 4,331,004, which issued on Aug. 11, 1981, Mar. 2, 1982 and May 25, 1982, respectively, to Richard Schmidt.

In the Schmidt devices, the actual coupling element, which is attached to each of a driving and a driven member, includes an annular portion and two pairs of parallel arms. Whereas the arms themselves are parallel, the pairs are not symmetrical. The arms are sufficiently flexible to provide good axial and/or angular displacement to compensate for the misalignment. However, there are inherent limitations in the design resulting in a limited ability to transfer high torque loads. This results from the fact that, regardless of the direction of rotation, at least one pair of arms at all times is in compression without any compensating tensile component. The result is that, under high torque conditions, the arm under compression is susceptible to buckling which, therefore, limits the load carrying capacity of the entire coupling element. The Schmidt type of device is also known as an open-end arm or open-link type of coupling.

Diaphragm-type coupling devices are known which permit large torque transmission, but are able only to handle slight angular misalignment on the order of $\frac{1}{4}$ degree to $\frac{1}{3}$ degree. In diaphragm-type coupling devices, either the driving or driven shaft connection is located proximate the center of the coupling device at an inner radius, and the other connection of the driving or driven shafts is located at an outer radius. Torque load is carried between the two shafts by the coupling device through a coupler to connection points which are attached to either one of the shafts. The torque load is carried in shear between the two radii of the connection points through a membrane. An example of this diaphragm-type of coupling device is Barth U.S. Pat. No. 4,776,824, which issued on Oct. 11, 1988. The Barth diaphragm-type coupling device has circumferentially-resilient spring leaves which are not rigid in the circumferential direction, but rather are designed to flex between the contact surfaces of the disc-like membrane in the circumferential direction. The Barth type coupling device is unable to carry a significant amount of torque load in shear across the spring leaves because the spring leaves are not rigid in the circumferential direction and, under a high torque load, would shear off near the thin portion of the spring leaves.

Another example of this diaphragm-type of coupling device is Venditty U.S. Pat. No. 2,386.017, which issued on Oct. 2, 1945. The Venditty diaphragm-type coupling device has spokes which connect each transverse corrugated foot or cross piece such that they are not substantially proximate a hub portion. Due to the radial length of the spokes, the spokes would not be rigid when carrying a torque load. Instead, the spokes would flex circumferentially from the torque load. The Venditty coupling device operates in a diaphragm type configuration by connecting all of the cross pieces at one radius to either the driving or driven element of a drive train and by connecting the hub portion of another radius to the other of the driving or driven element which is not connected to the cross pieces. The Venditty coupling device completely embeds the corrugated feet or cross pieces in a single rubber ring and connects the rubber ring to either the driving or driven member.

Yet another example of this diaphragm-type of coupling device is Paulsen et al. U.S. Pat. No. 2,046,206, which issued on Jun. 30, 1936. The Paulsen et al. diaphragm-type coupling device has openings proximate annular portions which connect a central flat portion to an outer rim portion. The openings are in the outer rim portion at an outer radius of the disc and are connected to the one of the two elements of a drive train (i.e., driving and driven elements). In addition, fixing means are located in the central flat portion at an inner radius of the disc and are connected to the other one of the two elements of the drive train.

It is another object of the present invention to provide a coupling mechanism which is capable of transferring torque loads in shear in addition to either tension or compression alone, to approximate a diaphragm-type performance, while permitting higher angular misalignment, and axial displacement, both continuous and intermittent.

It is another object of the present invention to provide a coupling mechanism which is capable of offsetting compression loads in each torque transmitting member by a tension load.

It is another object of the present invention to provide a coupling which eliminates fretting effects and fatigue adjacent to the means of attachment.

It is another object of the present invention to provide a coupling mechanism which is capable of removing flexible members without removing coupling hubs, intermediate members or floating shafts regardless of the coupling design.

It is another object of the present invention to provide a coupling mechanism which is capable of achieving increasing levels of critical speeds and reducing the torque stress.

It is another object of the present invention to provide a coupling mechanism which is capable of inhibiting fretting corrosion fatigue through unidirectional torque loading techniques.

It is another object of the present invention to provide a coupling mechanism which is capable of having an increased critical speed through unidirectional torque loading in the direction that subtracts centrifugal loading.

SUMMARY OF THE INVENTION

The coupling device of the invention includes a flexible disc-like coupling element or elements for use in joining a driving member to a driven member, which members may be misaligned. Each flexible disc-like coupling element is formed into a plurality of lobes which are interconnected by connector elements, which can take various forms. In one preferred form, the lobes are spaced from an inner hub portion or outer hub portion by generally radially extending connector elements. Each lobe has a pair of arms joined together adjacent the connector. They extend away from one another in substantially opposite directions, and terminate in free ends. This type of structure can be connected to driving and driven members in such manner as to cause force or torque transmission through the disc-like coupling element with shear loading on the connector element or tensile or compressive loading between the free ends of the lobes. There are mechanisms at the free ends for connecting the lobes selectively either to the driving and/or the driven members.

The coupling device may include a first and a second coupling member, respectively mounted to driving and driven shafts. At least one flexible disc-like coupling element is preferably located between the first and second coupling members in a preferred embodiment. The flexible disc-like coupling element is mounted to the first and second coupling members.

The above and other features of the invention including various and novel details of construction and combinations of parts, will now be more particularly described with reference to the accompanying drawings and pointed out in the claims. It will be understood that the particular misalignment compensating and high torque transmission coupling device embodying the invention is shown by way of illustration only and not as a limitation of the invention. The principles and features of this invention may be employed in varied and numerous embodiments without departing from the spirit and scope of the invention.

DESCRIPTION OF THE DRAWINGS

FIG. 8 is a preferred form of flexible coupling member which can be employed in the coupling mechanism of the invention.

FIGS. 9–34 and 43–49 illustrate alternative forms of flexible coupling members.

DETAILED DESCRIPTION OF THE INVENTION

Figure 1:
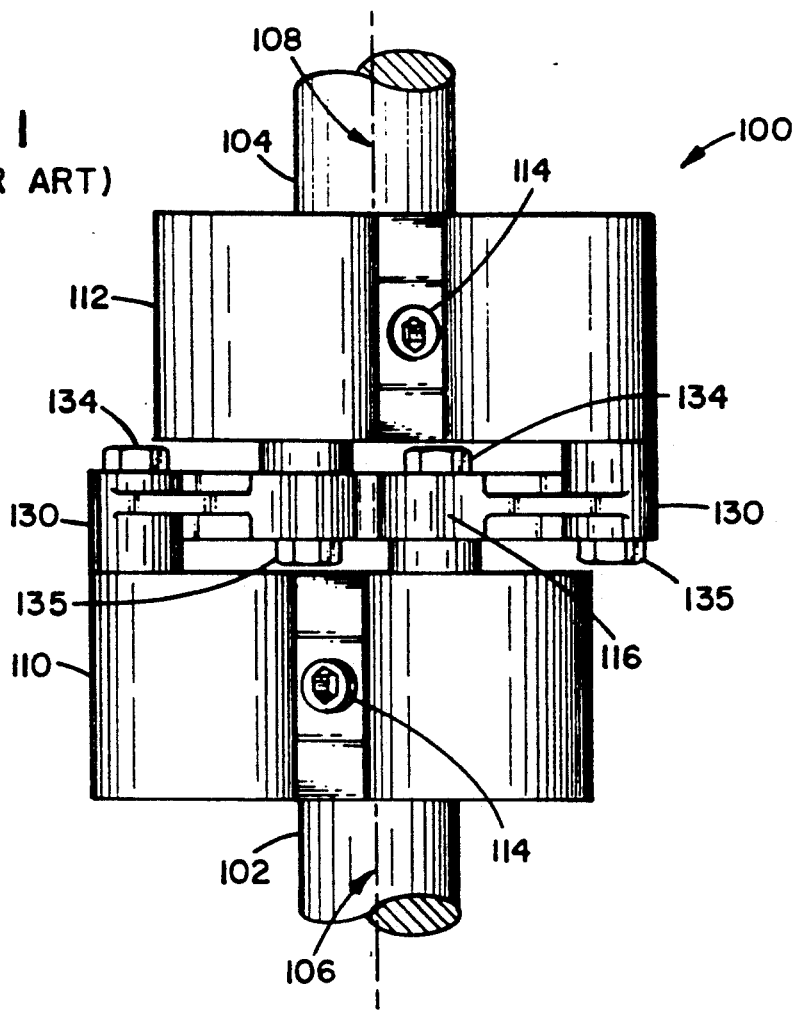
FIG. 1 is a side view of the coupling mechanism representing the prior art as taught in Schmidt U.S. Pat. No. 4,331,044.
Figure 2:
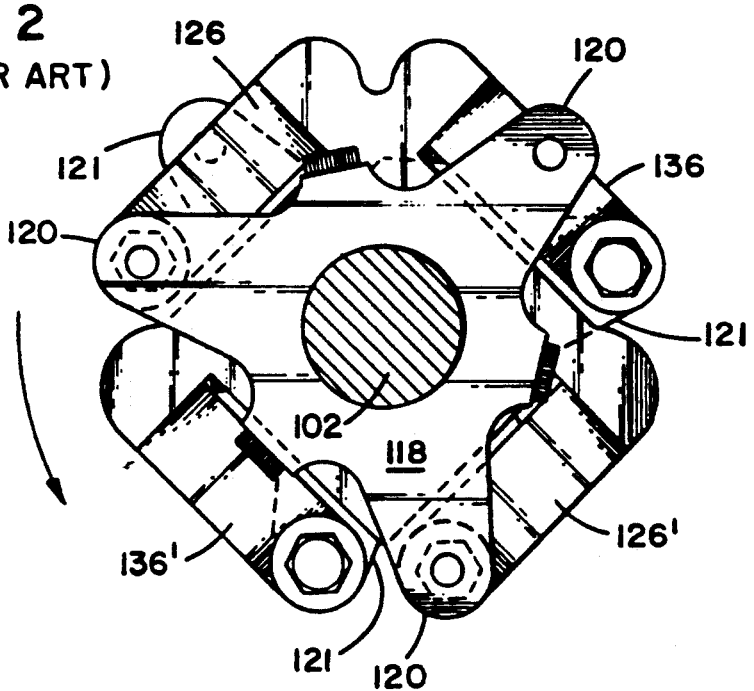
FIG. 2 is an end view of the prior art coupling mechanism of Schmidt shown in FIG. 1.
Figure 3:
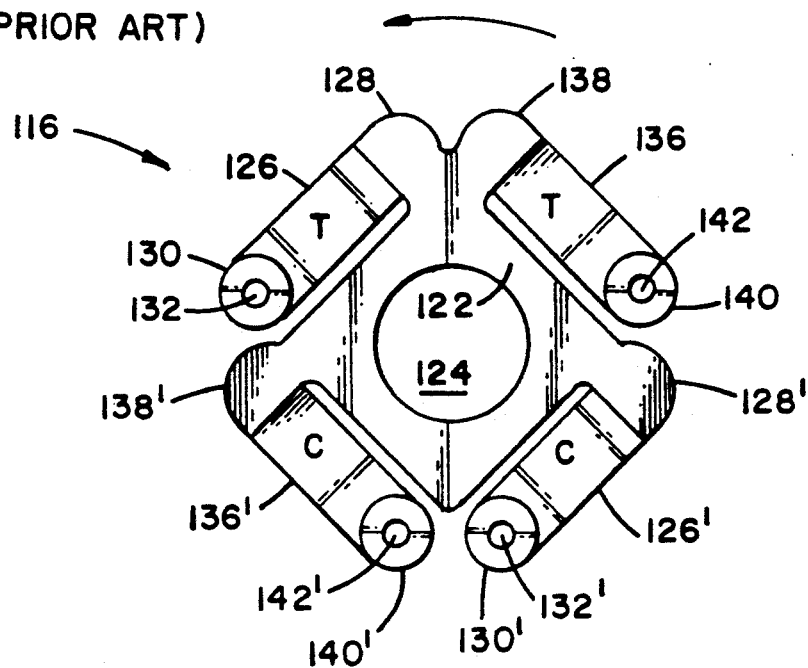
FIG. 3 is a flexible coupling member employed in the prior art Schmidt device.

Referring to FIGS. 1, 2 and 3, the prior art as represented by Schmidt U.S. Pat. No. 4,282,723 will now be described. The Schmidt device comprises a flexible coupling mechanism generally indicated as 100, which connects a first shaft 102, which can be a driving shaft, to a second shaft 104, which can be a driven shaft. Even though the axis of rotation 106 of the shaft 102 and the axis of rotation 108 of shaft 104 appear to be aligned, they may suffer from any one or combination of the misalignments described previously.

There are three basic members comprising the coupling mechanism 100. They include a first coupling member 110 (FIG. 1) and a second coupling member 112 which are adjustably secured to shafts 102 and 104 respectively by set screws 114 or their equivalents. A flexible member, generally indicated at 116, is located between the first and second coupling members 110 and 112. The first and second coupling members 110 and 112 are substantially identical to each other, consequentially, only one will be described here. Coupling member 110 includes a ring-shaped annular portion 118 having element receiving portions in the form of spider-like arms 120 extending radially outwardly and approximately 120 degrees apart.

Even though the first coupling member 110 has been described in general and shown in FIG. 2 in solid lines, the companion coupling member 112 is shown for the most part in dotted lines.

The prior art flexible coupling member 116 will best be seen in FIG. 3. It includes a generally ring-shaped annular portion 122 which has a cylindrical interior opening 124.

The member 116 also includes a first pair of opposed generally parallel arm portions 126, 126' having attached ends 128, 128' respectively connected to the annular portion 122. Each arm 126, 126' also has a free end 130, 130', respectively, provided with the openings 132, 132' respectively therein to receive a bolt to attach the arms 126, 126' to two of the three projecting spider-like arms 120 of the driving coupling member 110 as shown in FIGS. 1 and 2. The pair of free ends 130, 130' on the arms 126, 126', respectively, are each connected to the spider arms as shown in the lower right and upper left quadrants of FIG. 2, the connection being accomplished by bolts 134. The remaining spider-like arm 120 of the driving coupling member 100 (upper right quadrant of FIG. 2) remains unconnected.

The member 116 further has a second pair of opposed generally parallel arm portions 136, 136', having attached ends 138, 138' respectively connecting such arm portions to the annular portion 122. Each arm 136, 136' also has a free end 140, 140' respectively, provided with the openings 142, 142' respectively, therein to receive a bolt to attach the arms 136, 136' to two of the three projecting spider-like arms 121 of the driven coupling member 112, as shown in FIGS. 1 and 2. The pair of free ends 140, 140' on the arms 136, 136' respectively, are each connected to the spider arms 121 as shown in the lower left and upper right quadrants of FIG. 2, the connection being accomplished by bolts 135. The remaining spider-like arm 121 (upper left quadrant of FIG. 2) of the driven coupling member 112 remains unconnected.

In operation, the driving shaft 102 transmits torque through coupling member 110, the arm 120, to arm portion 126 of the intermediate member 116 (assuming a counter-clockwise rotation as shown in FIG. 2 and 3) through the bolt connection to arm end 130. The torque is then transmitted through the attached end 128 to ring portion 122 and end 138 to arm portion 136 and via arm 121 of the driven coupling member 112 to the shaft 104. At the same time, torque is also transmitted through arm 120 to arm portion 126' and end 128' to ring portion 122 and via end 138' to arm portion 136' and via another arm 121 and second coupling member 112 to shaft 104.

With the direction of rotation being counter-clockwise as viewed in FIGS. 2 and 3, as indicated by the arrows, the arm 126 is in tension and the arm 136' is in compression, as indicated respectively by the letters "T" and "C" in FIG. 3. Also, the arm 136 is in tension and the arm 136' is in compression as indicated by the letters T and C in FIG. 3. In other words, the coupling member 110 pulls the arm portion 126 and pushes the arm portion 126' by means of the bolts which pass through the free ends 130, 130' of the arm portions 126, 126', respectively. This renders arm 126' susceptible to columnar buckling, and thus limits high torque transmission. Also, the arm 136 is in tension and the arm 136' being in compression is also susceptible to columnar buckling. The foregoing shortcoming of the Schmidt coupling is one of the aspects which the present invention intends to improve upon.

While only a sketchy description of the apparatus and function disclosed by Schmidt has been given reference, see the patent cited for a more complete description of the function as well as how it behaves in transmitting torque between misaligned shafts. It should be noted that as described above the spider-like arm 120 in the upper right-hand quadrant of FIG. 2 is unconnected to the coupling member. The spider-like arm 121 which is part of the second coupling member 112 and shown in the upper left-hand quadrant of FIG. 2, is also unconnected.

Figure 4:
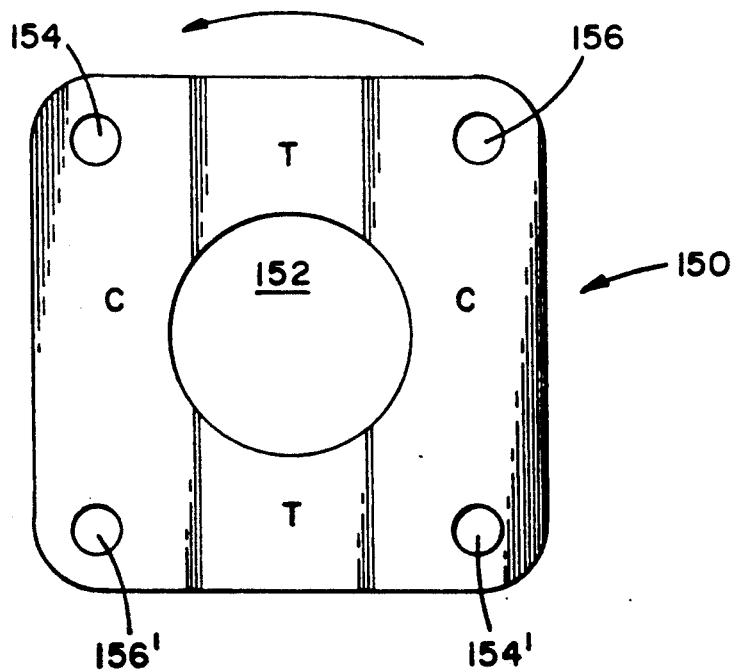
FIG. 4 is a view of a typical Formsprag ® type of flexible coupling member employed in the prior art.

As shown in FIG. 4, another type of prior art device is the Formsprag ® type of flexible member which can be used singly or in a pack. The flexible member may be in the form of a metal flexible disc 150 having a circular opening 152 and provided with four holes 154, 154', 156 and 156' for receiving bolts to be mounted to a driving and driven shaft coupling element. The connection of flexible disc 150 is similar to the Schmidt coupling in that bolt holes 154 and 154' are mounted to the driving shaft and bolt holes 156 and 156' are mounted to the driven shaft. Portions of the disc 150 are respectively placed in tension and in compression, assuming a counter-clockwise driving motion as shown by the arrow in FIG. 4. The tensile and compressive forces are indicated by the letters "T" and "C". Although in such a type of device the sides in tension restrain the sides in compression from collapsing, thereby obtaining good torque transmission, there is very limited ability to accept angular misalignment. This is another problem found in the prior art which the present invention is intended to overcome.

In a preferred form, the present invention is a disc-like coupling element which comprises a hub portion, a plurality of lobes spaced from the hub portion, and connector portion means corresponding to each lobe for connecting the corresponding lobe to the hub portion. Each lobe has a pair of arms joined together adjacent the connector portion means, extending away from one another in substantially opposite directions, and terminating in free ends.

The preferred form of the present invention further comprises configuration means for operating the disc-like coupling element in first and second configurations. The configuration means comprises means for operating in the first configuration by connecting the ends of both arms of one lobe to the driving member and connecting the ends of both arms of another lobe to the driven member. The configuration means further comprises means for operating in the second configuration by connecting the end of one arm of a particular lobe to the driving member and connecting the end of the other arm of the particular lobe to the driven member.

In addition, the hub portion, lobes, and connector portion means are preferably configured and arranged so that the disc-like coupling element can transmit substantially similar maximum torque levels between the driving and driven members of the drive train when connected in either the first configuration or the second configuration and so that the disc-like coupling element can accommodate substantially more misalignment between the driving and driven members of the drive train when connected in the first configuration than when connected in the second configuration. Each of these aspects of the preferred form of the present invention will be discussed in the present application.

It may be helpful in comparing the present invention to Bossler to discuss versions of the present invention which incorporate two lobes essentially facing one another, there being a number of such embodiments shown in the FIGS. of the present application. The neutral axes in the lobes of one preferred embodiment of the present invention are substantially arcuate, while the transmission of torque is in a substantially straight load path between and through the bolts or other connectors at the end of the lobes. Accordingly, the lobes of the present invention typically do not have torque transmission directly along a neutral axis in a lobe. An exception, as is illustrated in some of the FIGS., is to straighten out the typically substantially arcuate lobe of the present invention into straight lobes. In such embodiments of the present invention, there are two parallel lobes facing one another rather than two substantially arcuate lobes. Such straight lobe configurations have a straight neutral axis directly along the length of each lobe, with the load path of each lobe being coincident with the neutral axis. This is in substantial contrast to the Bossler configuration, which has a load path and neutral axis coincident in each arm, but with the arms forming a V.

Figure 50:
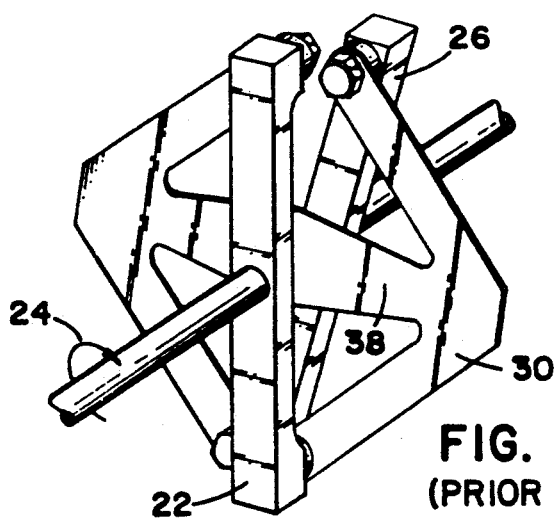
FIG. 50 is a view of a coupling as disclosed in Bossler, Jr. U.S. Pat. No. 4,321,805.

In the case of the present disc-like coupling invention connected in the second configuration, the load path goes substantially directly between and through the bolts or other connectors at each end of the lobe. In Bossler, however, the load path in each of the four arms is between a bolt at one end of an arm and the other end of the same arm, which is connected at a vertex of a V to Bossler's connecting piece 38 (see FIG. 50). Therefore, the present invention when configured with substantially arcuate lobes approximates a coupler which has two parallel lobes with a load path along the length of the lobe rather than four arms forming opposite Vs with two load paths in each V intersecting one another at the vertex of the Vs.

Whether one considers the present two-lobe design as approximating a coupler which has two parallel lobes or whether one configures the present invention into a configuration actually comprising two parallel lobes, the way in which such coupling elements transfer torque and the result that they achieve is substantially different than in Bossler. If two-lobe designs consistent with the present invention are configured with straight lobes parallel to one another, such straight lobes would have maximum torsional stiffness in comparison to substantially arcuate lobes, which would have a softer torque stiffness as is further discussed below. In either event, the way in which the present coupling and the Bossler coupling functions and the result that is achieved is substantially different.

In this regard, it can be seen that the way in which the present two-lobe configuration and the Bossler design operate is differentiated by a preferred feature of the present design. That feature is use of a constraint, preferably at the mid point along each lobe, with this constraint greatly increasing torque transmission and resistance to column buckling. This advantage and difference is present because a constraint at, for example, the mid point of a single load column in the design of the present invention produces an effective column length with respect to column buckling which is less than half the length over which the lobe flexing occurs. Further, in a preferred embodiment of the present invention, the constraint is substantially one-third the length of the lobe or column length, thus providing a column length with respect to column buckling that is one-third the flexing length.

This is in radical contrast to Bossler, which has four columns, two in each V, with no constraint along any of the columns, thus making the column length for column buckling equal to the flex length and, accordingly, substantially decreasing the capability to transmit torque. As previously indicated, this is in contrast to a preferred two-lobe design of the present invention connected in the second configuration, in which the flex length is equal to the entire lobe length between bolts or other connectors, while the column for column buckling is only one-third the flexing length. Accordingly, such a preferred embodiment of the present coupling provides substantially increased torque delivery due to a short column length for column buckling, while the Bossler configuration, although providing flex over the entire arm length, provides substantially reduced torque delivering capability, since the column length for column buckling is equal to the flex length.

Standard textbooks show that the tendency to have column buckling is inversely proportional to the square of column length. Therefore, with this consideration alone in mind, a preferred coupling of the present invention substantially equal in size to a Bossler coupling can transmit a torque radically greater than that of a similar sized Bossler coupling. For example, the assignee of the present invention has calculated that, for a stainless steel flex member having a thickness of 0.03 inch and a nominal diameter envelope of 4.5 inches, Bossler has a critical buckling load of 60 pounds while a preferred 4.5 inch diameter coupling of the present invention with a 0.03 inch thick stainless steel disc connected in the second configuration has a critical buckling load of about 700 pounds. Accordingly, considering only those aspects discussed thus far, it can be seen that the two designs operate in a substantially different way with respect to column buckling and produce radically different results with respect to the amount of torque which can be transferred.

Another significant difference in the way in which a second configuration preferred coupling of the present invention operates and the result it achieves by comparison to the Bossler design relates to the manner in which the lobes of the present invention and the Vs in Bossler are connected to one another. Lobes in the present coupling are preferably connected through connector portion means to a hub portion that at least partially defines and at least partially surrounds a central aperture, and the hub portion preferably comprises means for flexing radially in a direction substantially perpendicular to the nominal axis of rotation of the drive train. In the Bossler design, connecting member 38 is disclosed as a substantially straight column which extends in a straight line between the two Bossler Vs, each of which are connected to a corresponding end of the connecting member. Such a straight column is not suitable for torque transmission. However, in Bossler, torque transmission is through the arms. All illustrations in the Bossler patent illustrate only a straight column, and there are a variety of statements in the Bossler patent which indicate that only a straight column is contemplated.

One of these statements is in column 4, beginning at line 45, where it is stated that resistance to compression or column loading in Bossler's connecting piece 38 can be enhanced by adding ribs 52 extending along the length of the piece. This language indicating a "length" of connecting piece 38 implies a straight member, in contrast to a hub portion that at least partially defines and at least partially surrounds a central aperture. Further, Bossler's reference to connecting piece 38 as a column evidences that a straight connecting piece is contemplated. More specifically, increasing resistance to compression in column loading through the use of ribs requires that the connecting piece be of a straight column as opposed to comprising means for flexing radially. For example, if one were to put ribs around the circumference of a circular or semicircular member, the ribs would, in fact, lessen the resistance to loading between the two Vs. An example of increasing radially softness through the use of ribs in a circular member is disclosed in U.S. Pat. No. 3,808,837.

When the preferred coupling of the present invention is connected in the second configuration, incorporates substantially arcuate lobes, and is implemented in a direction of rotation such that the torque being delivered causes the lobes to be in tension, the tension in each lobe has a tendency to straighten the lobe out and to cause the hub portion to flex radially in a direction substantially perpendicular to the nominal axis of rotation of the drive train, thus preloading it. This movement of the lobe is radial in a direction substantially perpendicular to the nominal axis of rotation of the drive train and is carried out (1) through bending stress, which results in movement of a radial spring formed by the lobe's substantially arcuate neutral axis and linear load path and (2) through tensile stress, which results in tensile strain. At the same time, the centrifugal force of the hub portion works to restore the lobe to its original position, thus subtracting the torque stress that was placed on the lobe through the tension between the bolts or other connectors. Note that this interchange between the lobe and the hub portion has occurred in an plane which is substantially perpendicular to the nominal axis of rotation of the drive train.

In contrast, with the Bossler coupling moving in a direction such that each arm in a V is in tension, there is no spring movement of the arms, since the neutral axis and the load path are collinear in each arm, and movement within the arms occurs only through tensile strain. Furthermore, a resolution of tensile forces in each V arm provides a resultant force into the connecting piece with any movement of the connecting piece being either compressive strain or column buckling. Any such column buckling is out-of-plane deformation and typically causes the coupling to catastrophically collapse. Even if column buckling does not occur (such as when ribs are formed into connecting piece 38 of Bossler) there is no flexing radially in a direction substantially perpendicular to the nominal axis of rotation of the drive train as in the preferred couplings of the present invention. Similarly, even if non-catastrophic out-of-plane deformation occurs in the Bossler connecting element, there is little likelihood that centrifugal forces would return the element to its original shape, since the connecting element is a spoke with relatively little inertia rather than the rim of a fly wheel, such as is present in hub portions commonly used in the present design (see, for example, FIG. 8).

Therefore, no similar action resulting in subtraction of torque stress exists in the Bossler design. Note further that, in extremely high RPM situations, the Bossler design *adds* to the torque stress in each of the V arms (which wants to make the arms bow outward in a radial direction) due to the centrifugal stress (which is causing the arms to bow out) and that there is no mechanism to reduce or subtract the torque stress. This is even further aggravated if Bossler corrugates the central connecting element, since there can then be absolutely no centrifugal force used to return the Bossler arms to their original configuration, since the corrugation would prevent any movement other than strain in the connecting piece. In contrast, as previously indicated, the torque stress is overcome in the preferred design of the present invention having substantially arcuate lobes connected in the second configuration, since in that design the torque stress in the substantially arcuate lobes (which is brought about by the load path and neutral axis not being coincident) is cancelled by the centrifugal force as previously explained.

Thus, in the case of such a coupling being connected in the second configuration and rotating in a direction to cause the lobes to be placed in tension, the loading between bolts in a lobe causes preloading of the hub portion, and this preloading causes the hub portion to flex radially inward in a direction substantially perpendicular to the nominal axis of rotation of the drive train. The centrifugal force of the hub portion then counter balances the torque stress and tendency of the hub portion to move radially inward, and this outward centrifugal force results in an increased critical speed and decreased torque stress. In other words, this centrifugal force works to return the lobe in tension back to its original shape, thus lowering the torque stress in the lobe. Consequently, since the torque stress in the lobe is decreased, the critical or safe operating speed of the coupling is substantially enhanced. This phenomenon does not occur in the Bossler design, since connecting piece 38 in Bossler is essentially a spoke.

The hub portion in the present invention is sometimes referred to in the second configuration as a torque reaction member, this name implying the torque reaction just described. Recall that the torque reaction just described occurs only when the coupling is rotating in a direction causing the lobes to be in tension. When the coupling is rotating in the opposite direction, the lobes are in compression in the second configuration, and this causes the hub portion to move outward in a plane substantially perpendicular to the nominal axis of rotation of the drive train. In such a situation, centrifugal stress is added to torque stress, and the present coupling operates in a similar manner in this regard to many other couplings. However, in this direction of rotation, there is an advantage to the present design with respect to isolating torsional vibrations. This advantage is brought about by the centrifugal force adding to the torque stress, and the resulting increased torsional windup causes a lower torsional stiffness than other prior art disc couplings, thus lowering torsional vibrations. Bossler does not have this ability to soften or change the torsional stiffness in plane, and thus has no ability to lower torsional vibrations.

On the other hand, in the present invention connected in the first configuration (see, for example, FIG. 5), the hub portion is sometimes referred to as a torque transmission member, since the hub portion in this configuration does the primary torque transmission, the torque being transmitted to the hub portion in shear by connector portion means between the lobes and the hub portion.

By way of still another very important difference in the way that the present coupling and Bossler couplings operate and in the result that they achieve, there is additional significance in embodiments of the present coupling in which the neutral axis and load path are not collinear. The neutral axis in each substantially arcuate lobe of the present coupling has a curvature equal to the curvature of the lobe. The load path is essentially the same as a centerline extending between the center of the bolts or other connectors. This difference between the neutral axis and the load path produces a nonlinear spring operating in a plane which is substantially perpendicular to the nominal axis of rotation of the drive train. By adjusting the distance between the neutral axis and the load path at the center of each lobe (i.e., in a preferred embodiment, at the location of the connector portion means), the spring rate of the lobe arms is changed in a plane substantially perpendicular to the nominal axis of the drive train. Thus, the design of the present coupling provides a range of torsional and radial stiffnesses in a plane substantially perpendicular to the nominal axis of rotation of the drive train which does not exist in lobes of the present coupling that are straight, nor does it exist in the Bossler design, since the load path and neutral axis coincide in such designs. This adjustable torsional stiffness available through substantially arcuate lobes of the present coupling provides a mechanism for isolating torsional vibrations and altering natural frequencies which would otherwise be transmitted from the driving shaft to the driven shaft or visa versa.

The greater the distance between the load path and the neutral axis, the softer the torsional spring rate in the plane substantially perpendicular to the nominal axis of rotation of the drive train and the greater the ability to reduce or eliminate torsional vibrations. In practice, this is accomplished by increasing the angle between the bolt holes or other connectors proximate the ends of each lobe. As was previously indicated, this ability to adjust the spring rate enhances the ability of the disc-like coupling element to isolate torsional vibrations, something which the Bossler design is incapable of. In other words, the design of the present coupling which incorporates substantially arcuate lobes provides a nonlinear, in-plane, torsional spring, whereas the Bossler design or the design of the present coupling having substantially linear lobes, with the load and neutral axis in each arm or lobe being coincident, has no in-plane radial spring and no way to isolate torsional vibrations. The magnitude of the displacement of the radial spring in such preferred designs of the present coupling is on the order of several thousandths of an inch. However, this is sufficient to isolate torsional vibration, and the couplings can be tuned for particular vibration frequencies. Furthermore, the nonlinear nature of the radial spring changes its natural frequency as torque changes (e.g., at motor start up), thus providing the ability to reduce the effects of resonance through a typical torque range.

Figure 15:
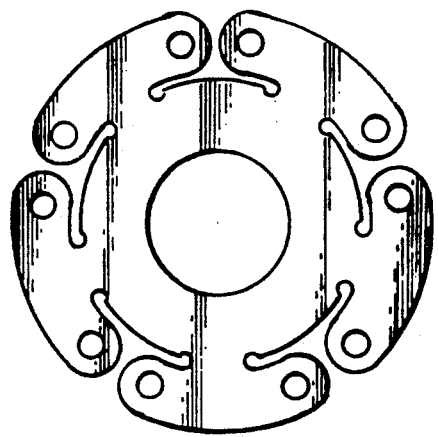
Figure 16:
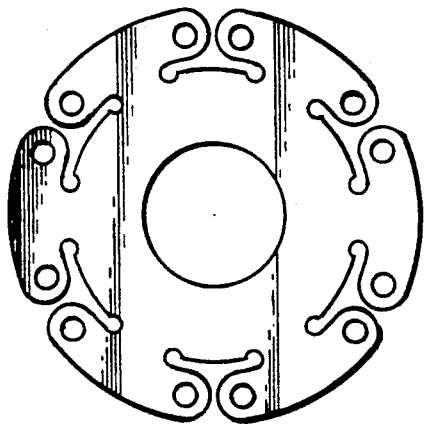

By way of a further difference in the way that the Bossler coupling operates and the result that it achieves when compared to a preferred coupling of the present invention connected in the second configuration, Bossler indicates in column 4 a particular arrangement which results in a constant velocity coupling. Beginning at line 58 of column 4, Bossler indicates that a feature of his coupling is that the line connecting the two points at which flex member 30 is connected to driving member 22 and the line connecting the two points at which the flex member is connected to the driven member 26 have a very small angle with one another and are close to being parallel. Bossler goes on to indicate that, with this being the case, as the driving shaft 24 is rotated, the driven member 26 is constrained at all angles of rotation to move at substantially the same speed as the driving member, and, therefore, the coupling has a substantially constant velocity characteristic whereby little or no vibratory forces are created as the coupling is operated. Bossler also refers to the constant velocity characteristic in column 6, line 24, following a description of FIGS. 15 and 16 showing a more complex coupling using a series of flexible members, and it is understood that Bossler considers all of his designs to provide constant or near constant velocity.

This is in contrast, for example, to a preferred two-lobe design of the present coupling having substantially arcuate lobes. In such a design, if one draws a line between the two points connected to the driven member and a line between the two points connected to the driving member, it will be seen that the lines are substantially perpendicular to one another, in contrast to the substantially parallel arrangement of Bossler. Accordingly, as is further explained below, the overall way in which such a coupling of the present invention operates and the result which is achieved is very different from the Bossler design. The first of these compares the ability of such a preferred two-lobe design of the present invention connected in the second configuration to achieve a constant bending stiffness at all angles as contrasted with the need in Bossler to use additional fixturing to achieve this result. The second of these relates to the ability of a preferred two-lobe design of the present coupling with a substantially C-shaped hub portion having the ability to retrofit and replace a Thomas or Formsprag ® type of coupling, which cannot be accomplished with the Bossler design.

With respect to the ability of the present coupling to achieve constant bending stiffness at all angles with a preferred arrangement of the bolts or other connectors being 90° apart as previously described, such a preferred coupling connected in the second configuration automatically provides constant bending stiffness at all angles. This is in contrast to a special configuration illustrated in FIGS. 13 and 14 of the Bossler patent. That design uses an additional connecting member in order to cause lines 70 and 72 (as are shown in the Bossler patent figures) to be at exactly right angles to one another. Accordingly, only this one configuration of the Bossler design achieves constant bending stiffness at all angles, whereas the preferred coupling configuration just described automatically achieves this result.

With respect to the ability of open-sided couplings of the present invention to retrofit and replace a Thomas or Formsprag ® type of coupling, in a preferred two-lobe design, the perpendicular arrangement of the lines drawn through the bolt holes or other connections also provides the ability to connect two disc-like coupling elements having substantially C-shaped or other open hub portions together so that they can be retrofitted onto a shaft and surround the shaft by having the substantially C-shaped or other open hub portions opposite one another. Thus, such a preferred coupling with the substantially C-shaped or other open hub portion has a substantial advantage in the way it can be used, since it can be retrofitted to designs in which the coupling extends over a shaft. Accordingly, such preferred designs of the present invention permit removing or inserting couplings over shafts without disassembly of the machinery, thereby saving significant labor costs. This is not possible with the Bossler design, which does not accommodate use of the coupling in such a way that a shaft passes through it. Furthermore, preferred two-lobe configurations of the present invention having a substantially C-shaped or other open-sided portion can be assembled at 90° to one another, thus providing a closed flexible member. This likewise is not possible with the Bossler couplings, and such use of the present couplings achieves a radically improved result with respect to fretting. When such preferred configurations are stacked 90° out of phase with one another, there is no contact between adjacent flexible discs in the region between connecting bolts or other connectors (i.e., over the length of the lobe between the connectors). Accordingly, there is no linear fretting in this region of the flexible lobes. Furthermore, such preferred couplings can be stacked as either mirror images, at 90° phasing or aligned, with each of these orientations resulting in substantially the same torque transmission.

By way of a further difference in the way in which the present couplings can be used by comparison to the Bossler design, the Bossler patent discloses use of its flexible couplings only individually, and there is no disclosure or even a suggestion of using layered flexible coupling members, as is common with the present invention, in order to increase torque transmission. The reason that Bossler does not stack flexible members in order to increase torque transmission capability is because he would then experience substantial fretting corrosion fatigue, which would substantially inhibit the ability to obtain angular misalignment with satisfactory coupling life, a primary objective of the Bossler structure. Rather, as Bossler desires to achieve increasing levels of torque while still achieving a high degree of angular misalignment, he uses a series of single flexible members with intermediate coupler. Although such an approach provides Bossler with a high degree of angular misalignment, such Bossler couplings still achieve relatively low torque transmission by comparison to industry standards. Thus, Bossler is interested in relatively low torque transmission with high angular displacement. In contrast, the present couplings are capable of high torque transmission in both configurations. When a high degree of flexibility is required, the first configuration is used.

In the preferred embodiment of the present invention, torque loads are carried mainly in the hub portion when the coupling is connected in the first configuration and mainly in the lobes when the coupling is connected in the second configuration. Because of the radial proximity of these alternative torque transmitting elements, the load carrying capabilities in the two configurations is nearly equal. Refinement of the torque carrying performance ratio between configurations can be achieved by dimensionally tuning or adjusting the desired elements of the present invention. Further advantages associated with the two configurations of the invention are discussed elsewhere in the present application.

By way of further explanation with reference to specific levels of torque transmission, in order to have a Bossler coupling which transmits typically useful torque levels, a coupling with a single flexible member would have to be relatively thick in comparison to state-of-the-art flexible discs. However, such a thick connecting piece would permit relatively little angular displacement. Even with stacking relatively thin flexible members (which Bossler does not suggest), the Bossler design achieves relatively small torque transfer when compared to designs of the present invention. For example, based on calculations made by the assignee of the present application, if Bossler were to stack three metal flexible discs each having a thickness of 0.03 inch thickness (a relatively thick flexible member based on industry standards), a maximum torque transmission of 150 inch pounds would result, and 450 inch pounds would fail the coupling. This is in contrast to a three-disc, stacked configuration of a present preferred coupling of the same thickness and nominal size, which would be capable of safely transmitting 3,200 inch pounds and failing at approximately 9,600 inch pounds. In this example, both the Bossler and the present couplings have a nominal diameter of 4.5 inches and are limited to approximately 1° of angular displacement because of fretting corrosion fatigue as opposed to bending fatigue.

In one configuration of the applicant's invention the use of lobes (shown in Schmidt as arms) is also found to be advantageous, but there is provided a connector element to each lobe to interconnect them which is positioned between the ends of the lobes to reduce the column length. Normally, a halfway positioning is optimum. This provides a buckling constraint whenever the lobes are loaded in compression. Under such loading, the column length is the distance between the connecting bolt or washer outer diameter, and the inner end of the connector neck, instead of the entire length of the arm as shown in the Schmidt device. This effectively reduces the column length subject to buckling, but does not reduce the effective flexing length of the lobe. Such a lobe/connector arrangement is thus preferred to obtain more torque. It is thus found that the shorter the length of the column arm, the more torque can be transmitted. Another feature of the present disc-like coupling element invention is the use of a hub portion to provide load sharing by distributing the torque transmittal forces.

In the present application, the disc-like invention is sometimes characterized as comprising a hub portion. Because of this frequent reference to hub portion as part of the disc-like coupling element, "hubs" as they are commonly referred to in the art to represent non-flexible members for attachment to drive shafts are frequently referred to in the present application as "couplers" or "coupling means" rather than "hubs."

Figure 7:
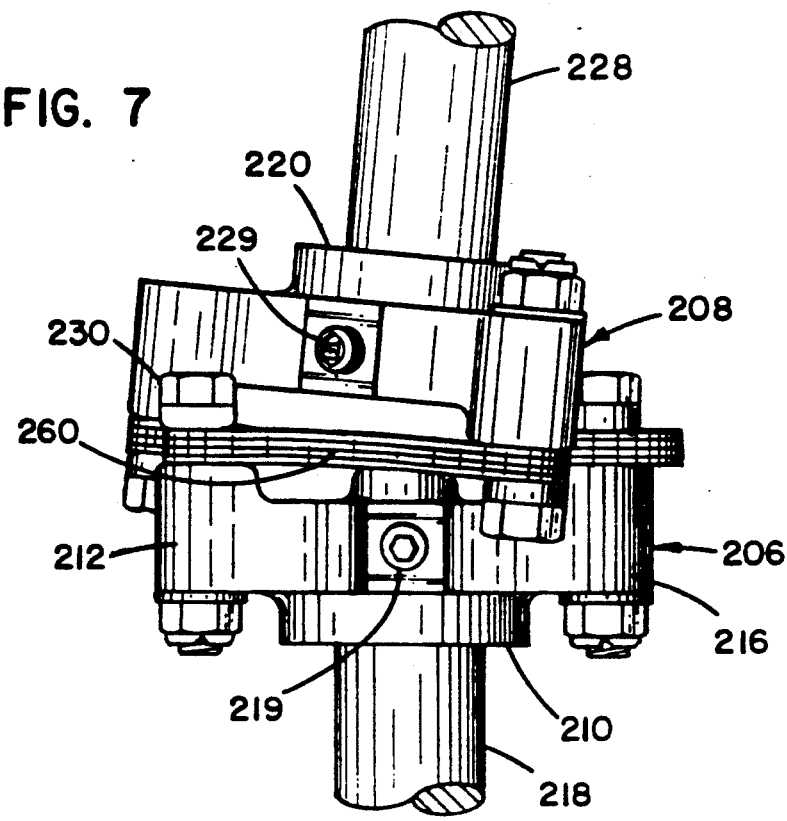
FIG. 7 is a side view of the coupling mechanism of FIG. 6.
Figure 6:
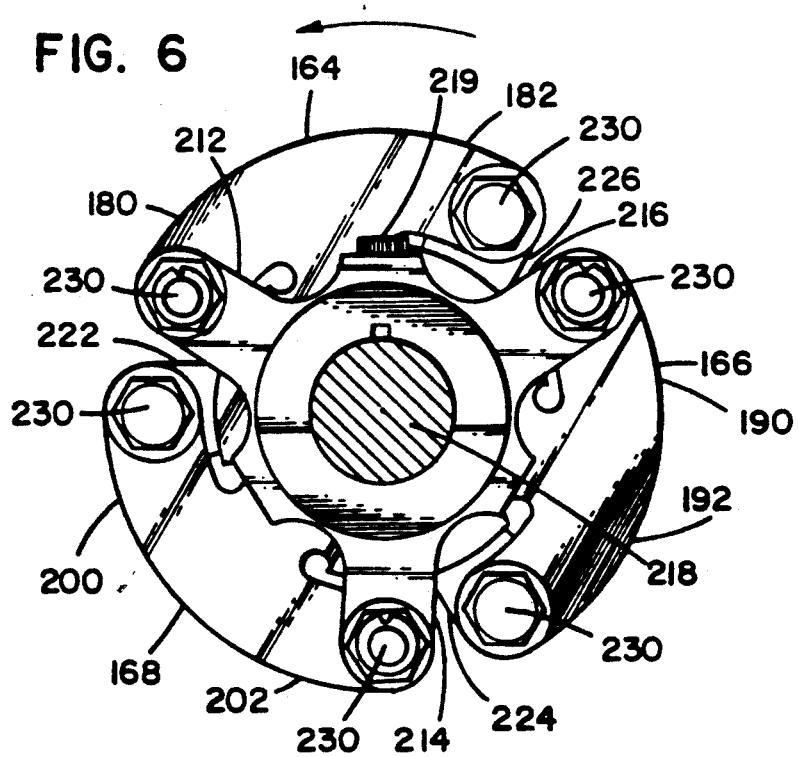
FIG. 6 is an end view of a preferred form of the coupling mechanism of the invention employing the flexible coupling member shown in FIG. 8.

A preferred form of applicant's invention is shown in FIGS. 6, 7 and 8 in which a flexible coupling disc member 160 is used. As shown in FIG. 8 the disc 160 includes an inner hub portion 162, which is illustrated as being essentially circular in shape. It will be appreciated by those skilled in the art that the flexible coupling disc member may be shaped in other forms such as, for example, the configurations of other disc-like coupling elements shown in the figures, without departing from the scope of the invention. In FIG. 8, there are shown a plurality of symmetrical outer lobes 164, 166 and 168, respectively connected to the inner hub portion 162 via connector portions 170, 172 and 174. The lobe 164 has a pair of arms 180, 182 joined together adjacent the radial connector 170 and extending away therefrom in opposite circumferential directions. Similarly, the lobe 166 is provided with the arms 190, 192 adjacent the radial connector 172; and the lobe 168 is provided with the arms 200, 202 adjacent the radial connector 174. Each lobe typically terminates in symmetrically arranged arms provided with mounting holes for bolts. Thus lobe 164 has bolt holes 184, 184' in arms 180, 182 respectively; lobe 166 has bolt holes 194, 194' in arms 190, 192 respectively; and lobe 168 has bolt holes 204, 204' in arms 200, 202 respectively.

As will be seen in FIG. 7 the discs 160 may be used in a plurality to form a disc pack. Each of these discs may be relatively thin or thick. They may be made of any appropriate similar or dissimilar metallic or nonmetallic material. Also, as seen in FIG. 7 the disc pack 260 serves as an intermediate coupling member (four individual flexible discs being shown, although any number can be used) which is bolted together between the first and second axially arranged coupling members 206 and 208 (shown as slightly misaligned in FIG. 7).

As shown in FIG. 6 the coupling member 206 is formed with three spider-like arms 212, 214 and 216 extending from a central hub 210 which contains a bore to accommodate the driver shaft 218. A set screw 219 is employed to secure the coupling member 206 to the driving shaft 218. In a similar manner, the driven coupling member 208 is formed with three spider-like arms 222, 224 and 226 extending from a central hub 220 containing a bore to accommodate the driven shaft 228. Set screw 229 is provided to secure the coupling member 208 to the driven shaft 228. Although not shown, keyways and keys may be used in a well understood manner with the set screws locking onto the keys themselves. Also, although a coupling member with "spider-like" arms is shown, other shapes, e.g. round, could be employed, while still coming within the spirit and scope of the invention.

FIGS. 6 and 7 show one preferred bolting arrangement. A series of identical bolts 230 or other connecting mechanisms are used as described hereafter. A bolt 230 secures the arm 180 of lobe 164 to the arm 212 of the driving member 206 (as shown at the 10 o'clock position of FIG. 6). Another bolt 230 secures the arm 202 of lobe 168 to the arm 214 of the driving member 206 (as shown at the 6 o'clock position of FIG. 6). Still another bolt 230 secures the arm 190 of lobe 166 to the arm 216 of the driving member 206. Similarly, the arms 222, 224 and 226 of the driven member 208 are bolted to the arms 200, 192 and 182 of the lobes 168, 166 and 164, respectively. Thus, each lobe is attached to both the driver and the driven coupling members and is flexed in the process of being driven, an example of which is shown in FIG. 7.

Assuming a counter-clockwise direction of rotation as shown by the arrow in FIG. 6, lobes 164, 166 and 168 are all placed in tension because their respective arms 180, 202 and 190 are being pulled by the respective spider-like arms 212, 214 and 216. No columnar buckling can occur in this arrangement. If a clockwise direction of rotation were chosen in FIG. 6, the lobes 164, 166 and 168 are all be placed in compression because their respective arms 180, 202 and 190 are being pushed by the respective spider-like arms 212, 214 and 216. Such applications of the present disc-like coupling invention can be referred to as unidirectional torque loading, since all lobes are in tension or all lobes are in compression. Fretting is inhibited due to the effect of compressive forces on the substrate of the material. In addition, unidirectional torque loading can reduce torque stress, thus allowing loads to be driven before reaching the critical speed.

The properties of unidirectional torque loading arise in preferred disc-like couplings where the hub portion comprises means for flexing radially in a direction substantially perpendicular to the nominal axis of rotation of the drive train. In such couplings, the means for flexing the hub portion radially in a direction substantially perpendicular to the nominal axis of the drive train is made available by comprising the hub portion of an element selected from the group consisting of (1) an arcuate member or (2) two substantially linear members joined at a point such that an included angle is formed.

When the hub portion comprises an arcuate member, the hub portion may comprise, for example, an open "C" shaped hub portion or a closed ring shaped hub portion. When the hub portion comprises two substantially linear members joined at a point such that an included angle is formed, the hub portion may comprise an hub portion having at least two substantially linear members which form an open shaped hub portion, such as shown in FIG. 32. With respect to closed hub portion shapes which include two substantially linear members joined at a point such that an included angle is formed, the hub portion may comprise shapes including but not limited to delta shapes (e.g., the delta shape shown in FIG. 31), and diamond shapes (e.g., the diamond shape shown in FIG. 19). All such hub portion shapes comprise means for flexing radially in a direction substantially perpendicular to the nominal axis of rotation of the drive train.

On example of radial flexing of the hub portion occurs when substantially arcuate lobes of the present disc-like coupling are under tension. Such tension causes deformation of the lobe and, in turn, deformation of the hub portion through the transfer of force toward the hub portion through the connector portion means. This deformation stores energy to aid centrifugal forces which works to restore the lobe to its original position. Furthermore, during such a process, tension loading of all lobes prevents the buckling of the lobes so that no torque fretting or torque fatigue takes place. In addition, the maximum critical speed of the disc-like coupling element is increased, and disc stress is reduced. Recall that these features of the present invention were discussed more completely in the Background of the invention section of the present application.

Figure 5:
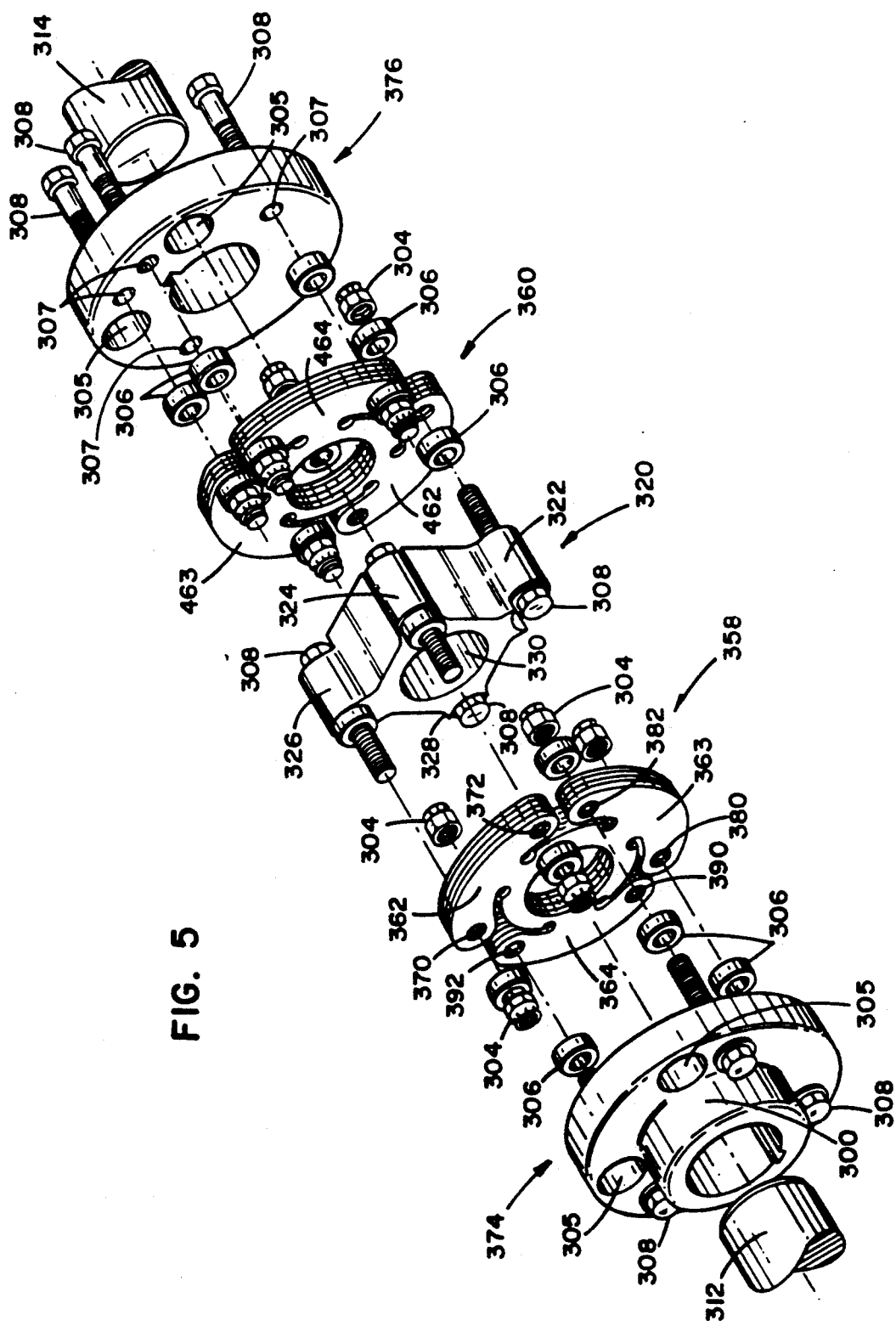
FIG. 5 is an exploded perspective view of a preferred form of the coupling mechanism of the invention employing an intermediate member.

In another preferred embodiment of the invention, an intermediate coupler is used. The arrangement is shown in the exploded perspective view of FIG. 5. A driving shaft 312 has mounted to it the first coupling member 374, which has an outwardly extending coupler 300 affixed to the shaft 312 by means of a key and set screw in a well known manner. A series of two access holes 305 pass through the coupling member 374. Four bolts 308 are arranged to pass through the coupling member through appropriate holes for fastening to a first disc pack 358. All of the bolts are assembled by means of a spacer washer 306 and nut 304. Each individual disc is shown formed in the manner similar to the disc 160 shown in FIG. 8. Alternatively, each individual disc-like coupling element may be formed in other configurations, e.g., the configurations of the other disc-like elements shown in the figures. Although four such discs are shown in FIG. 5 for each disc pack, any number can be used. Each disc may be separated from the next one by means of a spacer (not shown). Disc pack 360 is constructed similar to disc pack 358. Three lobes 362, 363 and 364 are formed by the disc pack 358. Lobe 362 is formed with through holes 370 and 372 at the ends of its arms; lobe 363 is formed with through holes 380 and 382 at the ends of its arms; and lobe 364 is formed with through holes 390 and 392 at the ends of its arms. Bolts 308 pass through the holes 392, 390, 380 and 382 to fasten the lobes 363 and 364 to the driving coupling member 374. The lobe 362 is fastened to an intermediate coupler 320. The coupler 320 is generally square shaped and has a central opening 330. Formed on the outer surface of the coupler 320 are four bosses 322, 324, 326 and 328, each of which has a through hole to receive a bolt 308. The lobe 362 is fastened to the intermediate coupler 320 by bolts passing through bosses 324 and 326 and through the holes 372 and 370, respectively. In a similar manner the lobe 462 of disc pack 360 is fastened to the intermediate coupler 320 by bolts 308 passing through the bosses 322 and 328 and through the holes in the ends of the arms of lobe 462. The lobes 463 and 464 of the disc pack 360 are fastened to the second coupling member 376 by means of bolts 308 passing through holes 307 in member 376 and through the appropriate holes in the lobes. The coupling member is in turn fastened to a driven shaft 314. Although only one intermediate coupler is shown in this preferred embodiment, a series of intermediate coupler (associated with a series of flexible disc packs) may be employed to accommodate greater misalignments.

With the coupling device of the invention as shown in FIG. 5 employing an intermediate coupler, the disc packs function in the manner of a "wish-bone", i.e. flexing occurs in the active inner ring or hub portions adjacent the lobes which are fastened to the intermediate coupler. Flexing in this manner greatly increases the flexing length, resulting in lower side forces, greater angular misalignment capability and predominantly high axial displacements. These are permitted without compromising the torque transmitting ability of the device when compared to convoluted diaphragm and disc couplings.

In an alternative embodiment of the present invention, pre-stressing of discs can be accomplished by forming the bolt holes further apart or closer together on the lobes than their respective positions at the mounting points on the coupling member or intermediate coupler. This deforms the lobes of the discs and places them in compression or tension when mounted in a coupling device even before torque is applied to the discs. During operation of the coupler, the discs will be subject to centrifugal forces due to high angular velocity which will substantially restore the shape of the lobe to a non-deformed shape as is more completely described in the Background of the invention section of the present application. The net result is that the discs can be tuned or mounted such that torque stress on the discs is reduced.

In an alternative preferred embodiment of the present invention, disc 160 may be pre-stressed by selecting a disc 160 which has bolt holes at a different radius than a disc that is normally mounted to a particular coupling member 208. For example, a disc 160 may preferably have bolt holes at a smaller radius than a disc that is normally used in assembling a coupling member. In this case, the bolts from the coupling member do not directly line up with the bolt holes on the disc 160, that is, the bolt holes and bolts are at slightly different radii from the axis of rotation of the disc and coupling member. As such, the lobe arms of the disc are mounted in tension. Similarly, when the disc has bolt holes at a slightly larger radius from the axis of rotation than the radius from the axis of rotation of the bolts coming from the coupling member, the lobe arms of the disc are mounted in compression. These mounting schemes deform the disc when mounted to a coupling member. However, during operation of the coupling device, the rotation of the disc restores the disc to a non-deformed state because of the centrifugal forces created by the rotation. This pre-stressing of the disc reduces the torque stress on the disc from what is normally placed on a non-pre-stressed disc during a similar torque stress situation. Thus, the discs can be tuned or mounted such that torque stress on the disc is reduced during high torque situations.

Referring by way of example to FIGS. 14, 19, 21 and 24, a disc pack formed from these disc shapes will function in a manner of a "double wish-bone flex". The lobes which are fastened to the intermediate coupler are essentially "dead" elements when the coupling device is in operation, and their connector portions to the inner ring or hub portion are subjected to shear forces. The lobes which are fastened to the driving or driven coupling member essentially are "dead" elements in the flex mode, but are a part of the torque transmission system since both ends of each lobe are fastened to the same member. There is essentially no flexure in these lobes and they do not bend. There is by this arrangement a greater ability to handle misalignment and greater ability to transfer torque, because it is handled in shear across the connector. Fretting action is eliminated as well as fatigue problems at the bolts because there is no bending of the arms of the lobes at arm attachment points. The lobes are not subject to column buckling.

As shown in FIG. 25 the teachings of the present invention may be applied to a flexible coupling disc 240 which has two lobes 242 and 252 connected to an inner hub portion 241 by connector portions 243 and 253, respectively. Although hub portion 241 is shown in the shape of ring, other shapes can be used, e.g. a diamond shape (FIG. 28), as long as the function of force transmission between lobes is obtained. A third connector element is provided in the form of lug portions 244 and 254, also connected to the ring or hub portion 241. Lobe 242 has bolt holes 246 and 248 at its ends, and lobe 250 has bolt holes 256 and 258 at its ends. Lug 244 is provided with bolt hole 245 and lug 254 is provided with bolt hole 255. The connection of the flexible coupling 240 has bolt holes 246, 255 and 256 in the coupler attached to the driving shaft and bolt holes 248, 245, 258 in the coupler attached to the driven shaft. With the direction of rotation of the coupling member being clockwise as indicated in FIG. 25, both ends of lobe 252 are placed in compression and both ends of lobe 242 are placed in tension. The lugs 244 and 254 are placed in shear. Forces are thus balanced out to obtain higher torque transmission, i.e. the shear and tension forces in lobe 242 and lugs 244 and 254 balance out the compression forces in lobe 252 to prevent column buckling.

To eliminate columnar loading entirely an intermediate coupling member can be used (as described in more detail hereafter), which is illustrated in FIG. 26. Flexible coupling disc 240' has two lobes 242' and 252', which are connected by connector portions 243' and 253' respectively to the hub portion 241'. Lobe 252' is provided with bolt holes 256' and 258' at its ends; and lobe 242' is provided with bolt holes 246' and 248' at its ends. Lugs 244' and 254' are provided with bolt holes 245' and 255', respectively, and are connected to an intermediate coupler (not shown) through bolt holes 245' and 255'. By using an intermediate coupler member, at least one flexible coupling disc must be placed on each side of such intermediate coupler for connection respectively to the driving and to the driven coupling member. FIG. 26 shows a disc which has both of its lobes 242' and 252' connected to the driving member, and another identical flexible coupling disc will have both of its lobes connected to the driven member. These will be mounted on either side of the intermediate hub portion and the lugs 244' and 254' of both of such discs are affixed to the intermediate coupler. Such an arrangement increases torque transmission still further since it is accomplished in shear similar to a diaphragm type of coupling and in tension compression similar to enclosed disc couplings. It is the shear forces generated at the connector portions 243' and 253' which cause force transmission, and the disc lobes are not column loaded since they function essentially as "dead" elements. The use of the intermediate coupler allows for more misalignment, and misalignment conditions.

Alternative forms of flexible coupling disc 240 may include, but are not limited to, FIGS. 26 through 30. In FIG. 26, the flexible coupling disc operates in substantially the same manner as flexible coupling 240. However, the arms of lobes 242' and 252' have been shortened to improve the stiffness of the lobe arms. Such stiffness may be desirable for particular coupler installation environments.

Shown in FIG. 27 is an alternative embodiment flexible coupling disc 260 which is similar to flexible coupling disc 240 shown in FIG. 25. However, a part of the ring or hub portion 266 adjacent lobes 262 and 264 have been eliminated so that the ring or hub portion has been configured into a "C" shape, i.e., with open ends. In addition, the lobes may be shortened in the length adjacent to the open part of the "C." This allows the flexible disc 260 when used in a disc pack to be readily removed from the coupling device for easy replacement of discs without having to disassemble the driving and driven coupling member from the respective shafts to which they are coupled. By alternately placing several flexible coupling discs 260 rotated respectively 180 degrees on top of each other, lug end portion 268 forms two lug portions opposite each other and adjacent lobes 262 and 264, thereby generating a flexible coupling disc pack shaped like the flexible coupling disc 240 shown in FIG. 25. Alternatively, ring-shaped hub portion 241, shown in FIG. 25, may be configured in a diamond shaped hub portion 270, shown in FIG. 28. Additionally, particular coupler installation environments may require only a single lug portion 274 as shown in FIG. 29 on flexible coupling disc 272. Flexible coupling disc 272 may be coupled to the driving and driven coupling members in one of two possible general configurations. In the first configuration, lug portion 274 is coupled to either the driving or driven coupling member and lobe arm portions 275, 276, 277 and 278 are coupled to the other driving or driven coupling member. In the second configuration, one of two lobe arm portion pairs 276, 277 and 275, 278 is coupled to the driving or driven coupling member along with lug portion 274 and the other lobe arm portion pair not coupled to the driving or driven coupling member is coupled to the driving or driven coupling member not coupled to the lug portion 274. Additionally, some coupling environments may require a flexible coupling disc 280 shown in FIG. 30. In such a configuration, one of the driving or driven coupling members attached to respective shafts is required to be relatively stiff compared to the other coupling member. Lug portions 284, 288 and 292 are attached to the driving or driven coupling member which must be held relatively stiff and lobe arms 282, 286 and 290 are attached to the driving or driven coupling member which does not need to be stiff but, rather, accommodate various degrees of misalignment.

As previously indicated flexible coupling disc shown in FIG. 8 may be configured in several different shapes and sizes depending upon particular coupler installation environments. In addition to the alternative embodiments previously discussed, shown in FIG. 9 through 23 and 31 through 34 are several additional possible shapes for different configurations as alternative embodiments of the present invention. Shown in FIG. 9 is a particular flexible coupling disc 300 similar to flexible coupling disc 160, shown in FIG. 8, except that a part of the ring portion adjacent to of the lobes has been eliminated so that the hub portion assumes an open-sided "C" shape, i.e., with open ends. This allows flexible coupling disc 300 when included in a disc pack to be readily removed from the coupling device for easy replacement of discs without having to disassemble the driving and driven coupling member from the respective shafts to which they are coupled.

Shown in FIG. 10 is flexible coupling disc 502 which is similar to flexible coupling disc 160 shown in FIG. 8. Hub portion 506 of flexible coupling disc 502 has been shaped such that opening 504 has been formed. Opening 504 of hub portion 506 may accommodate a shaft placed in opening 504. In an alternative arrangement, maximum torque transmission can be achieved by the solid clamping of one of the coupling members or intermediate hub to the bore hole opening 504. The attachment of the flexible disc 502 in this manner acts as a constraint on plate buckling, which thereby permits very high torque transmission at very high transient and continuous forms of misalignment.

Shown in FIG. 11 is an alternative flexible coupling disc 506 similar to flexible coupling disc 160 shown in FIG. 8. Flexible coupling disc 506 has been configured to have lobes with asymmetrical arm lengths which may be useful for attachment of the shorter arms to a coupling member which must be held relatively rigid or stiff and attaching the longer arms to the coupling member which is to accommodate greater degrees of misalignment and therefore be more flexible. For example, lobe 508 is coupled to hub portion 516 through connector element 514 such that lobe arm 510 is shorter than lobe arm 512.

In an alternative embodiment, a flexible coupling disc 518 as shown in FIG. 12 may be used in particular coupler environments which require relatively stiff flexible coupling discs. Thus, the lobe arms of the flexible coupling disc have been shortened to lessen the flexibility of the coupling disc.

Shown in FIG. 13 is an alternative flexible coupling disc 520 which has lobe arms with two different radii for the bolt connections of the lobe arms. By having one arm of a lobe closer to the central hub portion and one arm of the same lobe further away from the radius of the hub portion, the lobe arms closer to the hub portion may be attached to one coupling member and the lobe arms further away from the hub portion may be attached to the other coupling member.

Figure 14:
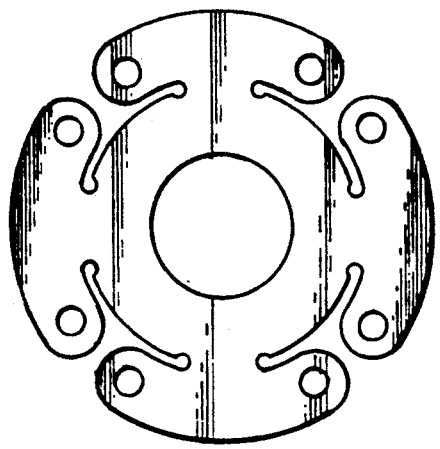

Shown in FIGS. 14, 15 and 16 are alternative flexible coupling discs which may be utilized in particular coupler environments which require more connector points to the coupling members than were available for the flexible coupling disc of 160 shown in FIG. 8. As such configurations incorporate increasing numbers of lobes, the torque carrying capacity of disc-like coupling elements is increased.

Figure 17:
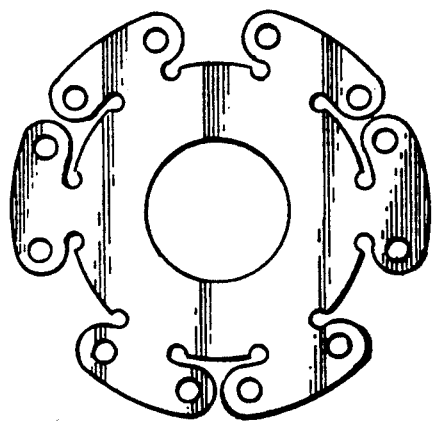

Shown in FIG. 17 is a flexible coupling disc which is a variation of the flexible coupling disc shown in FIG. 16. The lobes have been grouped into pairs of lobe adjacent one another in which the lobes are of equal size but closer together. Such a configuration may be useful in environments which require more attachment points and/or torque carrying capacity than provided by other flexible coupling discs.

Figure 18:
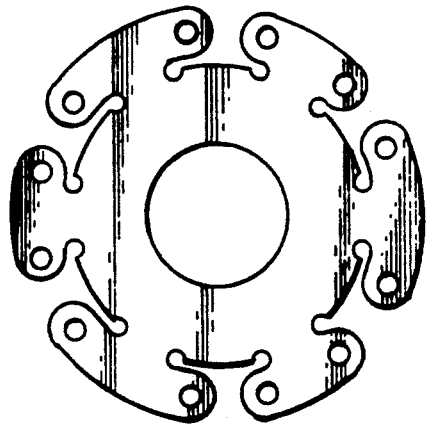

FIG. 18 shows a flexible coupling disc which is a variation of the flexible coupling disc shown in FIG. 16. In FIG. 18, the flexible coupling disc contains lobes of different sizes. Three lobes symmetrically spaced around the flexible coupling disc are shorter than the other three lobes equally spaced around the flexible coupling disc. This accommodates certain coupler environments which require one set of lobes coupled to a coupler member in a stiffer or more rigid than the lobes coupled to the other coupler member. It will be appreciated that various lengths or sizes of lobes may be utilized to accommodate particular stiffness and rigid stiffness or flexibility requirements of particular coupler environments.

Figure 19:
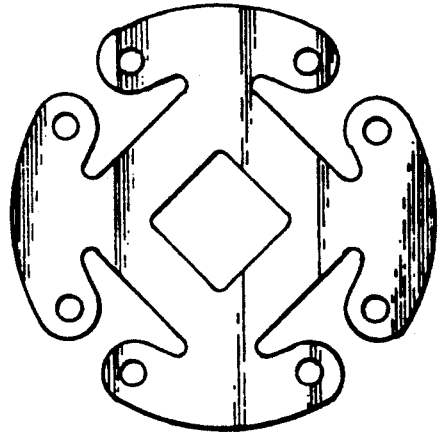

Shown in FIG. 19 is a flexible coupling disc with substantially straight portions of the torque transmission member. It will be appreciated that the diamond-like shape formed operates in substantially a similar manner as a ring-shaped hub portion.

Figure 20:
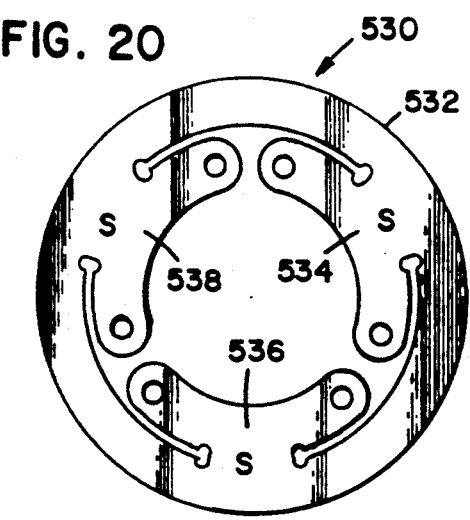

In an alternative embodiment, the flexible coupling disc may be configured as shown in FIG. 20, instead of an inner ring-shaped hub portion, the disc 530 is provided with an outer ring-shaped hub portion 532 having inwardly arranged lobes 534, 536 and 538. Lobes 534 and 536 may be connected to the driving coupling member while the lobe 538 is connected to the intermediate coupler. Companion discs or disc packs on the other side of the intermediate coupler have their lobes 534 and 536 connected to the driven coupling member. In such a coupling device, there is no column buckling in the arms of the lobes, and torque load is carried in shear at the connecting portions of the lobes and in compression tension by the outer ring-shaped hub portion. Alternative connecting arrangements may be used which do not include an intermediate coupler or which alter the connections of the respective lobe arms as have previously been discussed for flexible coupling discs with inner ring-shaped hub portions.

Figure 21:
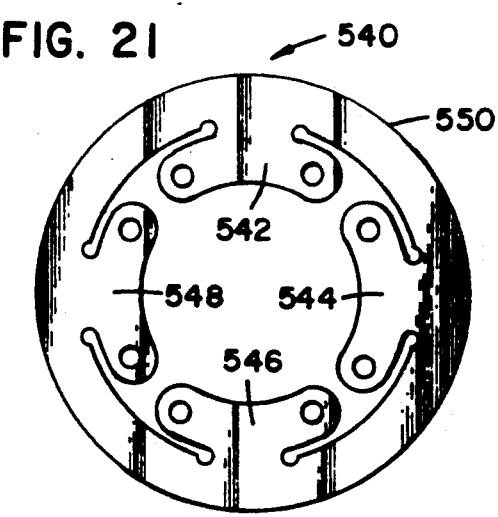

In FIG. 21, there are four lobes 542, 544, 546 and 548 connected to an outer ring-shaped hub portion 550 in a flexible coupling disc 540. With lobes 542 and 546 coupled to the driving coupling member and lobes 544 and 548 coupled to the driven coupling member, the disc functions as a solid hinged gimbal and large angular misalignment is possible. Where an intermediate coupler is employed, two of the lobes are connected to the intermediate coupler and another disc or disc pack is employed on the other side of the intermediate coupler which has two opposed lobes connected to another coupling member. This arrangement allows for parallel misalignment as well as angular misalignment.

Figure 22:
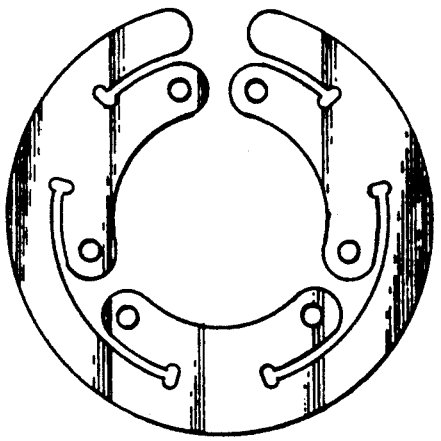

Shown in FIG. 22 is a flexible coupling disc similar to the flexible coupling disc shown in FIG. 20 except that a part of the ring-shaped hub portion adjacent two lobes has been eliminated so that the ring assumes a "C" shape, i.e., with open ends. This allows the flexible disc to be readily removed from the coupling device for easy replacement of discs without having to disassemble the driving and driven coupling member from the respective shafts to which they are coupled.

Figure 23:
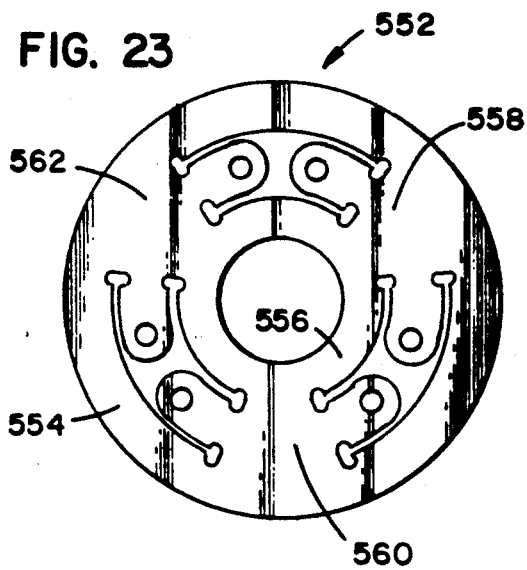

In an alternative embodiment, a flexible disc 552 could be employed as shown in FIG. 23. The flexible disc 552 is formed with an outer torque reaction ring-shaped hub portion 554 and an inner ring-shaped hub portion 556. Three lobes 558, 560 and 562 are connected between the inner and outer hub portion. When used with an intermediate coupler, lobes 558 and 560 are connected to one of the coupling members and lobe 562 is coupled to an intermediate coupler and a similar disc or disc pack is located on the other side of the intermediate coupler and connected to the driven coupling member instead of the driving coupling member. Such a configuration accommodates very high angular misalignment as well as very high torques simultaneously. The connector portions of the lobes are subjected to double shear because of the use of inner and outer ring-shaped hub portion. The "wish-bone" flexing as above described occurs at both the inner and outer connections through connector portion means to the lobes. It will be appreciated that variations of the flexible coupling disc 552 are contemplated such as the flexible coupling discs shown in FIG. 24 wherein a single ring-shaped hub portion is coupled to a pair of inner and outer lobes.

Figure 31:
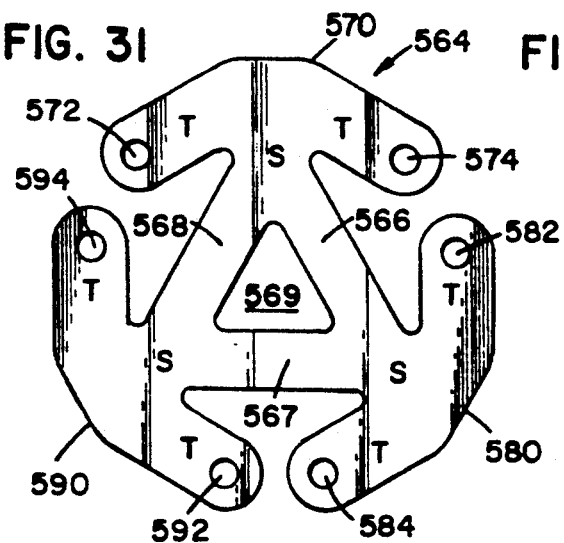
Figure 32:
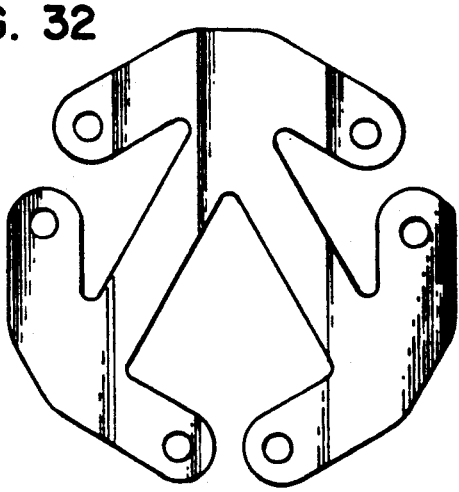

As shown in FIG. 31, a flexible coupling disc 564 is formed with three lobes 570, 580 and 590 which are interconnected by three linear members 566, 567 and 568 arranged in the form of a delta connection. In this arrangement, column buckling due to torque transmission is eliminated, therefore torque stiffness is increased. Other forms could be used such as two bars being joined to one lobe (as shown in FIG. 32). The lobes are provided with bolt holes 572, 582 and 592 for connection to a driving member or coupler, and holes 574, 584 and 594 for connection to the driven member or coupler. With rotation in the counter-clockwise direction, as shown in FIG. 31, each of the lobes will be in tension and subjected to radial flexing from torque. The hub portion twists due to the actions caused by angular and axial misalignment of the coupler.

Figure 33:
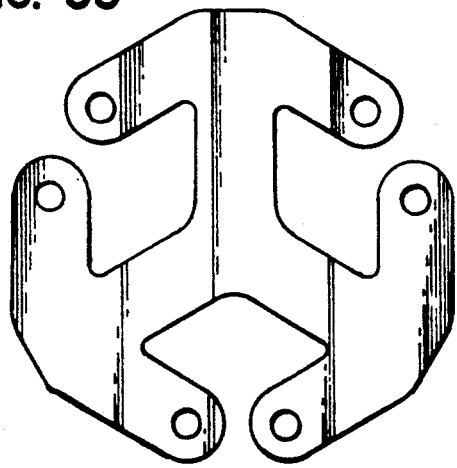
Figure 41:
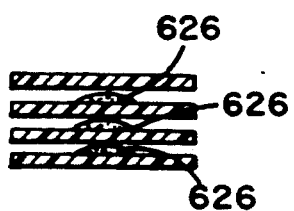
FIG. 41 is a sectional view of a portion of the flexible coupling member and mounting mechanism shown in FIG. 37.

Shown in FIGS. 33 and 41 are two embodiments which do not have the advantage of comprising means for flexing radially in a direction substantially perpendicular to the nominal axis of rotation of the drive train.

Figure 34:
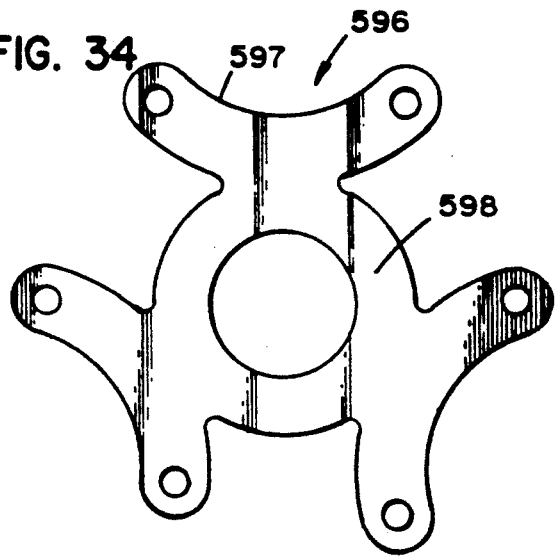
Figure 44:
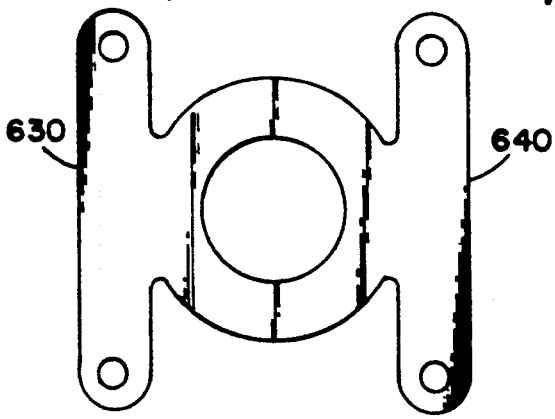
Figure 45:
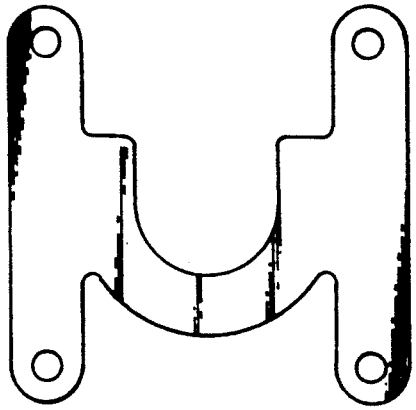

Shown in FIG. 34 is a flexible coupling disc 596 comprising an inner hub portion 598 coupled to inverted lobes such as lobe 597. Lobe 597 is shaped such that the arms are substantially further away from hub portion 598 than the portion of the lobe adjacent and coupled to hub portion 598. Such a shaped lobe may be useful in coupler environments which require high misalignment and lower torque transmission capability.

Figure 35:
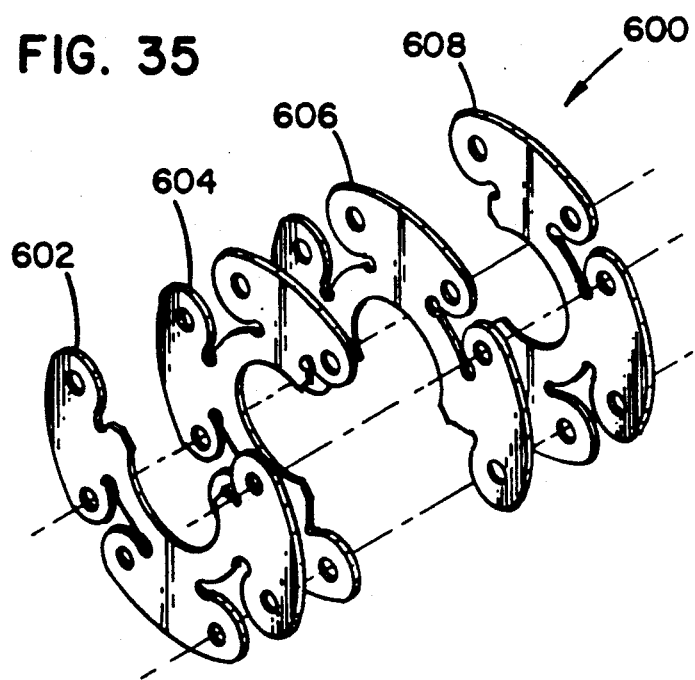
FIG. 35 is an exploded perspective view of a preferred form of mounting open-ended flexible coupling members of the invention which forms the equivalent of a closed flexible coupling member when mounted in the coupling mechanism.
Figure 36:
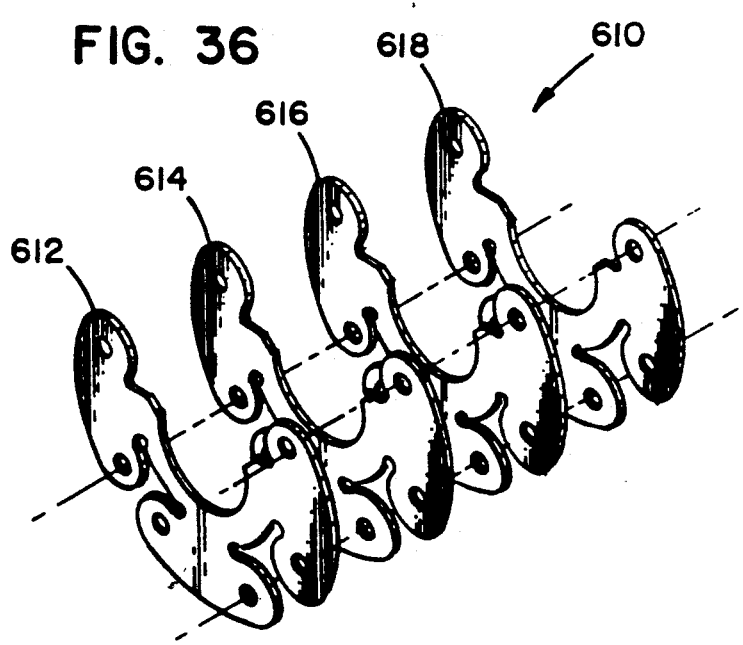
FIG. 36 is an exploded perspective view of an alternative form of mounting open-ended flexible coupling members so that the equivalent of an open-ended coupling member is formed in the coupling mechanism.

Shown in FIGS. 35 and 36 are examples of two ways of creating disc packs from open-ended flexible coupling discs. In a first configuration, shown in FIG. 35, a disc pack 600 is formed from flexible coupling discs 602, 604, 606 and 608 to form a disc pack with four lobes equally spaced around a central hub portion. Disc 604 is rotated 90 degrees clockwise from disc 602. Similarly, disc 606 is rotated 90 degrees clockwise from disc 604 and disc 608 is rotated 90 degrees from disc 606 along an axis which is perpendicular to a plane parallel to the substantially flat discs 602, 604, 606 and 608. As a result of the rotation of the four discs with respect to each other, a symmetrical four-lobed disc pack is formed. Similar open-ended discs of varying numbers of lobes could be combined to form symmetrical 3, 5, 6 or greater lobed disc packs.

In the second arrangement for open-ended flexible coupling discs formed into a disc pack shown in FIG. 36, flexible coupling discs 612, 614, 616 and 618 form an open-ended disc pack 610. Disc pack 610 comprises three lobes spaced around an open-ended torque transmission member.

These disc packs may be held together with a bushing as is known in the art. This bushed disc pack is easier to mount to a coupling member, since the disc pack may be mounted in one step rather than through individual steps of placing each individual disc into a mounting mechanism of a coupling member.

Figure 37:
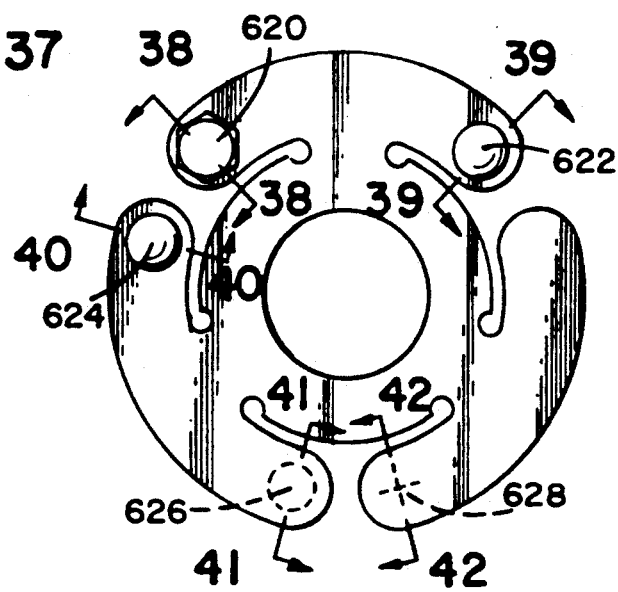
FIG. 37 is a preferred form of the flexible coupling member as shown in FIG. 8 which shows several alternative forms of mounting the flexible coupling member to the coupling mechanism.
Figure 38:
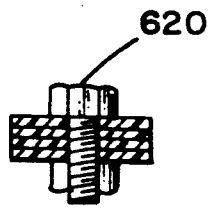
FIG. 38 is a sectional view of a portion of the flexible coupling member and mounting mechanism shown in FIG. 37.
Figure 39:
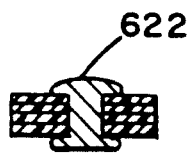
FIG. 39 is a sectional view of a portion of the flexible coupling member and mounting mechanism shown in FIG. 37.
Figure 40:
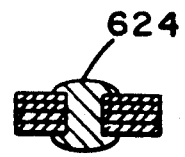
FIG. 40 is a sectional view of a portion of the flexible coupling member and mounting mechanism shown in FIG. 37.
Figure 42:
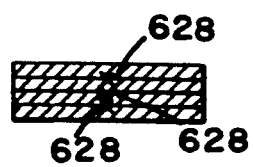
FIG. 42 is a sectional view of a portion of the flexible coupling member and mounting mechanism shown in FIG. 37.
Figure 46:
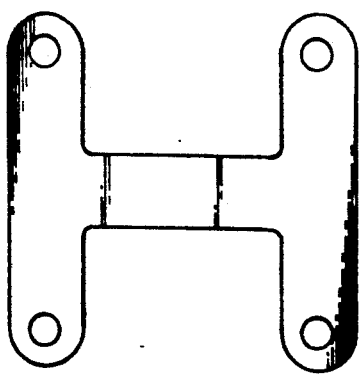
Figure 47:
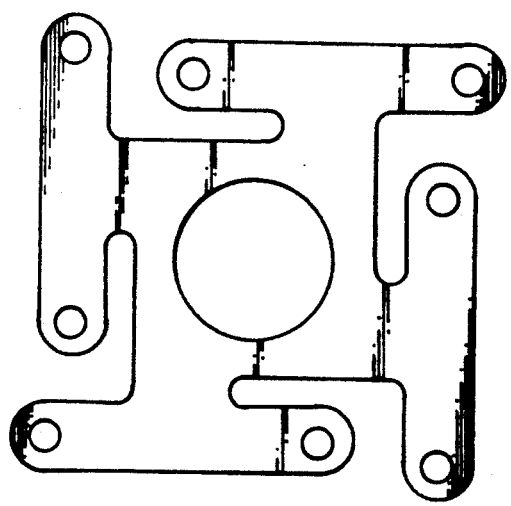

Shown in FIG. 37 are alternative attachment mechanisms for coupling lobe arms to coupling members or an intermediate member. In the preferred embodiment, a nut and bolt arrangement 620, as shown in a sectional view in FIG. 38, is used. Alternatively, flexible coupling discs may be attached to coupling members or an intermediate coupler through the use of a metal stake weld 622 as shown in a sectional view in FIG. 39. The use of the stake weld mechanism is possible in high torque transmission couplings of the present invention due to the use of attachment points at the free end of the lobe arms which reduces stress on the stake welds. Similarly, a rivet 624, as shown in FIG. 40, epoxy adhesive points or bonds 626, as shown in FIG. 41, and spot weld points 628, shown in FIG. 42, may be used as mechanisms to attach flexible coupling discs to coupler.

An alternative way to describe the present invention is provided in the following description. Referring generally now to FIGS. 5–8, flexible couplings for joining a driving member to a driven member in a drive train are shown. The drive train has a nominal axis of rotation as is shown, for example, by the center line passing through shafts 312 and 314. The flexible couplings include drive train apparatus having at least a first flexible disc-like coupling element such as the disc-like coupling element 160 shown in FIG. 8.

The disc-like coupling element 160 as shown in FIG. 8 includes a hub portion 162 at least partially defining and at least partially surrounding a central aperture. The hub portion 162 can flex radially in a direction substantially perpendicular to the nominal axis of rotation. Hub portion 162 may comprise an arcuate member such as the arcuate member between connector portions 170 and 172. Alternatively, hub portion 162 may have at least two substantially linear members joined at a point such that an included angle is formed like the two linear members 566 and 567 shown in FIG. 31.

In addition, the disc-like coupling element 160 includes a plurality of lobes (e.g., lobes 164,166,168) spaced from the hub portion 162. Also, the disc-like coupling element 160 includes a connector portion (e.g., connector portion 170, 172 and 174) which corresponds to each lobe for connecting the corresponding lobe (e.g., lobes 164,166 and 168, respectively) to the hub portion 162. Each connector portion preferably is located and has a radial length between the hub portion 162 and the corresponding lobe such that the corresponding lobe is substantially proximate the hub portion 162. Each connector portion is substantially circumferentially rigid across radial dimension of the disc-like coupling element 160. Each lobe has a pair of arms (e.g., arms 180 and 182) joined together adjacent a connector portion (e.g., connector portion 170), extending away from one another in substantially opposite directions, and terminating in free ends. Each lobe preferably is formed so that it comprises an element selected from the group consisting of (1) a substantially linear lobe having substantially straight collinear arms and a substantially collinear load path and neutral axis (e.g., lobes 630 and 640) or (2) a substantially arcuate lobe formed so that, whenever a load is applied across the free ends of the arms of the lobe, the load path is separate from the neutral axis of the lobe (e.g., lobes 164, 166, 168, 570, 580, 590).

Further, the disc-like coupling element 160 can be configured to operate in first and second configurations. As shown in FIG. 5, a disc-like coupling element like coupling element 160 operates in the first configuration by connecting the ends of both arms of one lobe (e.g., the arms of lobe 363) to the driving member (e.g., coupler 374 which is connected to driving shaft 312) and by connecting the ends of both arms of another lobe (e.g., the arms of lobe 362) to the driven member (e.g., intermediate coupler 320) which is connected to driven shaft 314 through disc pack 360 and coupling 376. As shown in FIGS. 6 and 7, a disc-like coupling element like coupling element 160 operates in the second configuration by connecting the end of one arm of a particular lobe (e.g, arm 180 of lobe 164) to the driving member (e.g., coupler 206 which is connected to driving shaft 218) and connecting the end of the other arm of the particular lobe (e.g, arm 182 of lobe 164) to the driven member (e.g., coupler 208 which is connected to driven shaft 228).

Alternatively as shown in FIG. 9, the disc-like coupling element 500 can have an hub portion consisting of at least one arcuate member which forms an open-shaped hub portion. Alternatively as shown in FIG. 32, the disc-like coupling element can have an hub portion comprising at least two substantially linear members which form an open-shaped hub portion. As shown in FIG. 35, the drive train apparatus can include a plurality of disc-like coupling elements having an open-shaped hub portion 602, 604, 606, and 608 which are assembled to form a disc pack 600 having an closed shape. As shown in FIG. 36, the drive train apparatus can include a plurality of disc-like coupling elements having an open-shaped hub portion 612, 614, 616, and 618 which are assembled to form a disc pack 610 having an open shape.

The disc-like coupling element can have an hub portion which defines a variety of shapes including but not limited to delta shapes (e.g., the delta shape shown in FIG. 31), ring shapes (e.g., the ring shape shown in FIG. 8), and diamond shapes (e.g., the diamond shape shown in FIG. 19).

As shown in FIG. 9, the disc-like coupling element can have a hub portion which includes two arcuate members. Each arcuate member has a first and second ends. The first end of one arcuate member is connected to the first end of another arcuate member and the second ends of the arcuate members are separated so that the two arcuate members form an open shape. One connector portion is located adjacent the connected first ends of the two arcuate members and an additional connector portion is located adjacent the second end of each arcuate member.

Similarly, as shown in FIG. 32, the disc-like coupling element can have a hub portion which includes two substantially linear members. Each linear member has a first and second ends. The first end of one linear member is connected to the first end of another linear member and the second ends of the linear members are separated so that the two linear members form an open shape. One connector portion is located adjacent the connected first ends of the two linear members and an additional connector portion is located adjacent the second end of each linear member.

In the disc-like coupling element 160 shown in FIG. 8, the hub portion 162 can also be described as a closed-shaped annulus member. Further, the disc-like coupling elements 160 can be assembled to form a disc pack (e.g. disc pack 260 shown in FIG. 7).

As shown in FIG. 8, the disc-like coupling element 160 can have a hub portion 162 which includes at least three arcuate members which form a closed shape surrounding the defined aperture. Each arcuate member has two ends and each end of each arcuate member is connected to one end of another arcuate member One connector portion is located adjacent each pair of connected arcuate member ends.

Similarly, as shown in FIG. 31, the disc-like coupling element 564 can have a hub portion which includes at least three substantially linear members 566, 567, and 568 which form a closed shape surrounding the defined aperture 569. Each linear member has a two ends and each end of each linear member is connected to one end of another linear member. One connector portion is located adjacent each pair of connected linear member ends.

As shown in FIG. 25, the disc-like coupling element 240 can have at least one lug portion (e.g., lug portion 244) connected to and extending away from the hub portion 241. Each lug portion includes a mechanism (e.g. bolt hole 245) for selectively connecting to the driving or the driven member of a drive train.

As shown in FIG. 8, the disc-like coupling element 160 can have an hub portion 162 comprising an inner hub portion. In addition, the lobes 164, 166, and 168 are spaced outward from the inner hub portion 162 away from the defined aperture.

Alternatively, as shown in FIG. 20, the disc-like coupling element 530 can have an hub portion 532 comprising an outer hub portion. In addition, the lobes 534, 536, and 538 are spaced inward from the outer hub portion 532 within the defined aperture.

Alternatively, as shown in FIG. 23, the disc-like coupling element 552 can have an hub portion comprising both an inner 556 and outer 554 hub portion. In addition, first connector portions join each corresponding lobe to the inner hub portion 556 and second connector portions join each corresponding lobe to the outer hub portion 554. The lobes 558, 560, and 562 are positioned between the inner and outer hub portions.

Figure 24:
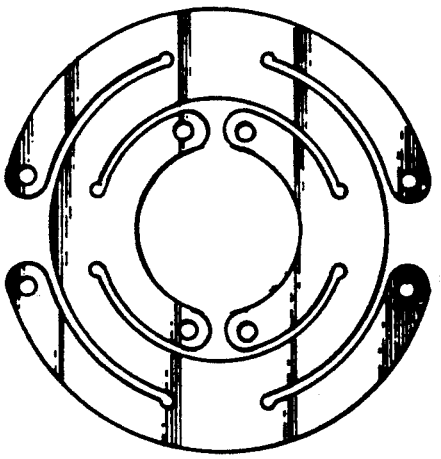
Figure 43:
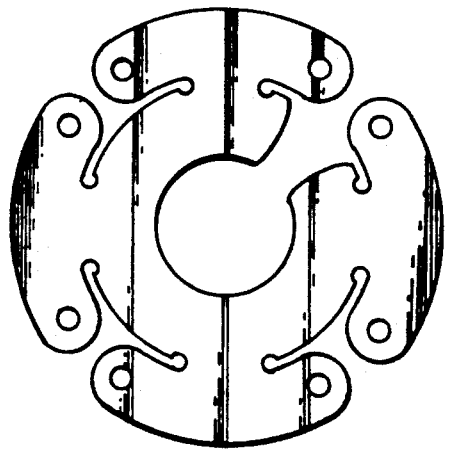

Alternatively, as shown in FIG. 24, the disc-like coupling element can have at least one lobe spaced inward from the hub portion and at least one lobe spaced outward from the hub portion.

Referring now to FIGS. 5, 6 and 7, the drive train apparatus can further include first and second couplers (e.g. couplers 206 and 208) for attachment to driving and driven shafts of the drive train (e.g. shafts 218 and 228) respectively. Each coupler includes an axis of rotation and first and second mounting mechanisms (e.g., bolt holes of spider arms 212 and 214) located radially from the respective axis of rotation.

As shown in FIG. 5, this drive train apparatus with first and second couplers as well as a disc-like coupling element like coupling element 160 (FIG. 8) is connected in the first configuration by connecting the ends of both arms of one lobe 363 to the first and second mounting mechanisms of the first coupler 374 and by connecting the ends of both arms of another lobe 362 to the first and second mounting mechanisms of the second coupler 320.

As shown in FIGS. 6 and 7, this drive train apparatus with first and second couplers as well as a disc-like coupling element like coupling element 160 is connected in the second configuration by connecting the end of one arm 180 of a first lobe 164 to the first mounting mechanism of first coupler 206 and by connecting the end of the other arm 182 of the first lobe 164 to the first mounting mechanism of the second coupler 208. Further, second configuration connections include connecting the end of one arm 190 of a second lobe 166 to the second mounting mechanism of first coupler 206 and by connecting the end of the other arm 192 of the second lobe 166 to the second mounting mechanism of the second coupler 208.

Referring now to FIG. 5, the drive train apparatus can further include in addition to the first and second couplers, an intermediate coupler 320 for coupling between the first and second couplers 374 and 376. The intermediate coupler 320 includes an axis of rotation and first, second, third and fourth mounting mechanisms (e.g., bolt holes of bosses 322, 324, 326, and 328) located radially from the respective axis of rotation. The first flexible disc-like coupling element 358 is located between the first coupler 374 and the intermediate coupler 320. Additionally, the drive train apparatus further includes a second flexible disc-like coupling element 360 located between the intermediate coupler 320 and the second coupler 376.

As shown in FIG. 5, this drive train apparatus with first, second and intermediate couplers as well as first and second disc-like coupling elements is connected in the first configuration by connecting the ends of both arms of one lobe 363 of the first disc-like coupling element 358 to the first and second mounting mechanisms of the first coupler 374, connecting the ends of both arms of another lobe 362 of the first disc-like coupling element 358 to the second and third mounting mechanisms of the intermediate coupler 320, connecting the ends of both arms of one lobe 462 of the second disc-like coupling element 360 to the first and fourth mounting mechanisms of the intermediate coupler 320, and connecting the ends of both arms of another lobe 463 of the second disc-like coupling element 360 to the first and second mounting mechanisms of the second coupler 376.

The drive train shown in FIGS. 6 and 7, with the addition of an intermediate coupler having spider-like arms similar to couplers 206 and 208 and a second disc-like coupling element or disc pack, can be connected in the second configuration by connecting one arm of a particular lobe of the first disc-like coupling element to the first mounting mechanism of the first coupler, connecting the other arm of the particular lobe of the first disc-like coupling element to the first mounting mechanism of the intermediate coupler, connecting one arm of a particular lobe of the second disc-like coupling element to the first mounting mechanism of the second coupler, and connecting the other arm of the particular lobe of the second disc-like coupling element to the second mounting mechanism of the intermediate coupler.

An alternative description of the second configuration connection for this drive train apparatus with first, second and intermediate couplers as well as first and second disc-like coupling elements can include: connecting one arm of a particular lobe of the first disc-like coupling element to the first mounting mechanism of the first coupler, connecting the other arm of the first lobe of the first disc-like coupling element to the third mounting mechanism of the intermediate coupler, connecting one arm of a second lobe of the first disc-like coupling element to the second mounting mechanism of the first coupler, connecting the other arm of the second lobe of the first disc-like coupling element to the first mounting mechanism of the intermediate coupler, connecting one arm of a first lobe of the second disc-like coupling element to the first mounting mechanism of the second coupler, connecting the other arm of the first lobe of the second disc-like coupling element to the fourth mounting mechanism of the intermediate coupler, connecting one arm of a second lobe of the second disc-like coupling element to the second mounting mechanism of the second coupler, and connecting the other arm of the second lobe of the first disc-like coupling element to the second mounting mechanism of the intermediate coupler.

Referring now to FIGS. 25 and 26, the drive train apparatus can further include in addition to the first and second couplers, an intermediate coupler for coupling between the first and second couplers. The intermediate coupler includes an axis of rotation and first, second, third, fourth, fifth and sixth mounting mechanisms located radially from the respective axis of rotation. The first flexible disc-like coupling element is located between the first coupler and the intermediate coupler. Additionally, the drive train apparatus further includes a second flexible disc-like coupling element located between the intermediate coupler and the second coupler. Each disc-like coupling element similar to disc-like element 240 includes at least one lug portion (e.g., lug portion 244) connected to and extending away from the hub portion 241. In addition to being able to be configured in the first and second configurations, the disc-like coupling element 240 can be configured to operate in a third configuration by connecting respectively the ends of both arms of one lobe of the first disc-like coupling element to the first and second mounting mechanisms of the first coupler, connecting the at least one lug portion of the first disc-like coupling element to the first mounting mechanism of the intermediate coupler, connecting the at least one lug portion of the second disc-like coupling element to the second mounting mechanism of the intermediate coupler, and connecting respectively the ends of both arms of one lobe of the second disc-like coupling element to the first and second mounting mechanisms of the second coupler.

Alternatively as shown in FIG. 10, the disc-like coupling element 502 can have an hub portion 506 including a mounting mechanism 504 for connecting the hub portion 506 to one of the couplers of the driving and driven members including the first, second and intermediate couplers.

As shown in FIG. 8, the connector portions can be spaced around the hub portion 162 such that they are substantially equidistant from one another. In addition, each lobe (e.g., lobe 164) can be tangentially attached to the hub portion 162 by the corresponding connector portion (e.g., connector portion 170). Further, the arms of the lobes (e.g., arms 180 and 182 of lobe 164) can be of substantially equal length and can have substantially symmetrical shapes. In addition, the arms of the lobes (e.g., arms 180 and 182 of lobe 164) can extend circumferentially away from one another substantially along the contour of the hub portion 162.

Alternatively as shown in FIG. 13, the disc-like coupling element 520 can have the free end of one arm of a particular lobe located closer to the hub portion than the free end of the other arm of the particular lobe.

As shown in FIGS. 37–42, the disc-like coupling element can be configured in different operating configurations by using one of several types of attachment devices including: a bolt, a rivet, a stake weld, a spot weld, and an epoxy bond for selectively connecting the arms of the lobes to the driving or the driven member of the drive train apparatus.

As was previously indicated, the present disc-like coupling elements may be made of any appropriate metallic or nonmetallic material. When used in disc packs, metallic and nonmetallic discs can be combined in the same disc pack. Alternatively, disc-like coupling elements of a similar or identical material may be combined into a single disc pack.

When the present disc-like coupling elements are connected in the configuration shown in FIGS. 6 and 7, it has been found that a composite material of glass fibers and epoxy in a cross ply but not woven pattern is suitable. Such a material is available under the trademark Scotchply® 1002, made by 3M Company (Scotchply® is a registered trademark of 3M Company). When the present disc-like coupling elements are connected in the configuration shown in FIG. 5, it has been found that stainless steels of the 300 type are a suitable material for fabricating the disc-like elements. Material thicknesses can vary greatly and depends typically on the torque to be transferred and the flexibility desired.

Figure 48:
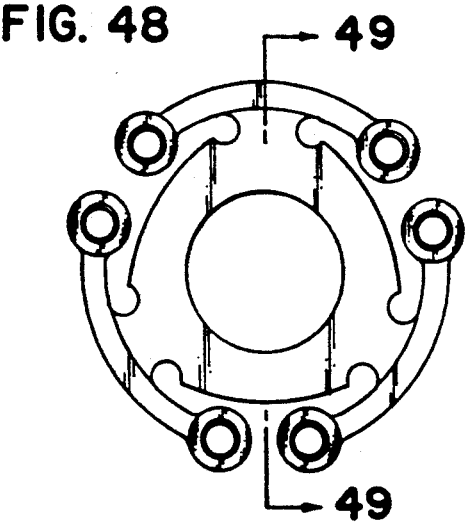
Figure 49:
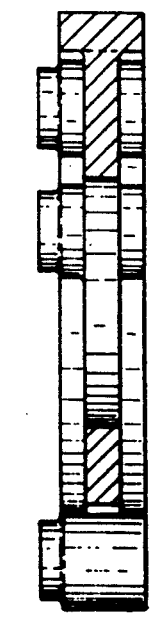

Elements such as those shown in FIG. 5 through 37 and in FIGS. 43 through 47 can be made to have substantially uniform thickness through processes including stamping, milling, and laser cutting such as from sheet material. Alternatively, through processes such as milling, injection molding, or casting, the cross-sectional thickness of various portions of the disc-like coupling elements can be varied. Such a configuration is shown in FIGS. 48-49, which show a disc-like element typically made by injection molding wherein the thickness of the lobes can be seen to be greater than the thickness of the connector portion means and hub. By adjusting such thicknesses, varying performance can be achieved. For example, the radial flexibility of the arms of the lobes shown in FIGS. 48 and 49 can be altered by changing the cross-sectional configuration of the arms. Parts that are injection molded may be formed of any suitable material, it having been found that acetal resins available under the DuPont trademark of Delrin ® are satisfactory materials (Delrin ® is a registered trademark of the DuPont Co.).

Although the present invention has been described and illustrated with a certain degree of particularity, it is understood that the present disclosure of embodiments has been made by way of example only and that numerous changes in the arrangement and combination of parts may be resorted to by those skilled in the art without the departing from the spirit and scope of the present invention as claimed.

What is claimed is:

1. A flexible disc-like coupling element, comprising:
   (a) a substantially arcuate shaped hub portion at least partially defining and at least partially surrounding a central aperture, the hub portion comprising a radial dimension as defined from the central aperture of the disc-like coupling element, the hub portion comprising means for flexing across the radial dimension within the plane of the disc-like coupling element;
   (b) a plurality of lobes spaced from the hub portion;
   (c) connector portion means corresponding to each lobe for connecting the corresponding lobe to the hub portion; and
   (d) each lobe having a pair of substantially arcuate shaped arms joined together adjacent its corresponding connector portion means, extending away from one another in substantially opposite directions, and terminating in free ends, the free ends of the arms having attachment means for attaching the disc-like coupling element to other elements of a drive train apparatus, the attachment means being located at a substantially identical radial distance from the central aperture of the disc-like coupling element.

2. The flexible coupling element of claim 1 wherein;
   (a) each connector portion means is located and has a radial length between the hub portion and the corresponding lobe such that the corresponding lobe is substantially proximate the hub portion; and
   (b) each connector portion means is substantially circumferentially rigid across the radial dimension of the disc-like coupling element.

3. The flexible coupling element of claim 1 wherein the hub portion means for flexing comprises an arcuate member which forms an open-shaped hub portion.

4. The flexible coupling element of claim 1 wherein:
   (a) the hub portion comprises two arcuate members, each arcuate member having first and second ends, the first end of one arcuate member being connected to the first end of another arcuate member, the second ends of the arcuate members being separated so that the two arcuate members form an open shape; and
   (b) one of the connector portion means is located adjacent the connected first ends of the two arcuate members, and another one of the connector portion means is located adjacent the second end of each arcuate member.

5. The flexible coupling element of claim 1 wherein the hub portion comprises a closed-shaped annulus member.

6. The flexible coupling element of claim 1 wherein:
   (a) the hub portion comprises at least three arcuate members which form a closed shape surrounding the aperture, each arcuate member having two ends, each end of each arcuate member being connected to the end of another arcuate member; and
   (b) one of the connector portion means is located adjacent each pair of connected arcuate member ends.

7. The flexible coupling element of claim 1 wherein:
   (a) the hub portion comprises an inner hub portion; and
   (b) the lobes are spaced outward from the inner hub portion outside the aperture.

8. The flexible coupling element of claim 1 wherein:
   (a) the hub portion comprises an outer hub portion; and
   (b) the lobes are spaced inward from the outer hub portion within the aperture.

9. The flexible coupling element of claim 1 wherein at least one lobe is spaced inward from the hub portion within the aperture and at least one lobe is spaced outward from the hub portion outside the aperture.

10. The flexible coupling element of claim 1 wherein the connector portion means are substantially equidistant from one another.

11. The flexible coupling element of claim 1 wherein each lobe is tangentially attached to the hub portion by the corresponding connector portion means.

12. The flexible coupling element of claim 1 wherein the arms of the lobes are of substantially equal length.

13. The flexible coupling element of claim 1 wherein the arms of the lobes comprise substantially symmetrical shapes.

14. The flexible coupling element of claim 1 wherein the arms of the lobes extend circumferentially away from one another substantially along the contour of the hub portion.

15. The flexible coupling element of claim 1 wherein the attachment means comprises an attachment device selected from the group consisting essentially of a bolt, rivet, stake weld, spot weld, and epoxy bond which can be used for selectively connecting the ends of the arms of the lobes to a driving or a driven member of a drive train apparatus.

16. A flexible coupling for joining a driving shaft to a driven shaft in a drive train apparatus, the drive train apparatus having a nominal axis of rotation, the flexible coupling comprising:

(a) first and second coupling means for attachment to the driving and the driven shafts of the drive train apparatus, respectively, each coupling means including first and second mounting mechanisms located radially from the nominal axis of rotation; and (b) a flexible disc-like coupling element adapted to be operatively located in between the first and second coupling means, the disc-like coupling element comprising:

(i) a substantially arcuate shaped hub portion at least partially defining and at least partially surrounding a central aperture, the hub portion comprising a radial dimension as defined from the central aperture of the disc-like coupling element, the hub portion comprising means for flexing across the radial dimension within the plane of the disc-like coupling element;

(ii) a plurality of lobes spaced from the hub portion;

(iii) connector portion means corresponding to each lobe for connecting the corresponding lobe to the hub portion; and (iv) each lobe having a pair of substantially arcuate shaped arms joined together adjacent its corresponding connector portion means, extending away from one another in substantially opposite directions, and terminating in free ends, the free ends of the arms having attachment means for attaching the disc-like coupling element to other elements of a drive train apparatus, the attachment means being located at a substantially identical radial distance from the central aperture of the disc-like coupling element.

17. The flexible coupling of claim 16 further comprising a plurality of disc-like coupling elements which are assembled to form a disc pack having a closed-shaped hub portion and which are located between the first and second coupling means, each disc-like coupling element overlying another disc-like coupling element of the disc pack such that the attachment means of each disc-like coupling element are substantially aligned with the attachment means of another disc-like coupling element.

18. The flexible coupling of claim 16 further comprising a plurality of disc-like coupling elements which are assembled to form a disc pack having an open-shaped hub portion and which are located between the first and second coupling means, each disc-like coupling element overlying another disc-like coupling element of the disc pack such that the attachment means of each disc-like coupling element are substantially aligned with the attachment means of another disc-like coupling element.

19. The flexible coupling of claim 16 wherein the disc-like coupling element is connected in an operational configuration to the first and second coupling means such that:

(a) both arms of a first lobe are connected respectively to the first and second mounting mechanisms of the first coupling means; and (b) both arms of a second lobe are connected respectively to the first and second mounting mechanisms of the second coupling means.

20. The flexible coupling of claim 16 wherein the disc-like coupling element is connected in an operational configuration to the first and second coupling means such that:

(a) one arm of a first lobe is connected to the first mounting mechanism of the first coupling means;

(b) the other arm of the first lobe is connected to the first mounting mechanism of the second coupling means;

(c) one arm of a second lobe is connected to the second mounting mechanism of the first coupling means; and (d) the other arm of the second lobe is connected to the second mounting mechamsm of the second coupling means.

21. The flexible coupling of claim 16 wherein the arms of the lobes are connected to the first and second coupling means through unidirectional torque loading such that the lobes are in tension whenever the first and second coupling means are attached to the driving and driven shafts of the drive train apparatus, respectively, and the driving shaft is driving the driven shaft.

22. The flexible coupling of claim 21 wherein the unidirectional torque loading is in the direction that reduces the torque stress during utilization of the flexible coupling.

23. The flexible coupling of claim 16 wherein the disc-like coupling element is mounted to the first and second coupling means such that the disc-like coupling element is pre-stressed, thereby enabling a reduction in the torque stress whenever the first and second coupling means are attached to the driving and driven shafts of the drive train apparatus, respectively, and the driving shaft is driving the driven shaft.

24. A flexible coupling for joining a driving shaft to a driven shaft in a drive train apparatus, the drive train apparatus having a nominal axis of rotation, the flexible coupling comprising:

(a) first and second coupling means for attachment to the driving and the driven shafts of the drive train apparatus, respectively;

(b) intermediate coupling means for providing an intermediate coupling between the first and second coupling means;

(c) each coupling means including first and second mounting mechanisms located radically from the nominal axis of rotation; and (d) a first flexible disc-like coupling element adapted to be operatively located in between the first and the intermediate coupling means and a second flexible disc-like coupling element adapted to be operatively located in between the intermediate and the second coupling means; each disc-like coupling element comprising:

(i) a substantially arcuate shaped hub portion at least partially defining and at least partially surrounding a central aperture, the hub portion comprising a radial dimension as defined from the central aperture of the disc-like coupling element, the hub portion comprising means for flexing across the radial dimension within the plane of the disc-like coupling element;

(ii) a plurality of lobes spaced from the hub portion;

(iii) connector portion means corresponding to each lobe for connecting the corresponding lobe to the hub portion; and (iv) each lobe having a pair of substantially arcuate shaped arms joined together adjacent its corresponding connector portion means, extending away from one another in substantially opposite directions, and terminating in free ends, the free ends of the arms having attachment means for attaching the disc-like coupling element to other elements of a drive train apparatus, the attachment means being located at a substantially identical radial distance from the central aperture of the disc-like coupling element.

25. The flexible coupling of claim 24 further comprising a plurality of disc-like coupling elements which are assembled to form a first disc pack having a closed-shaped hub portion which is located between the first and the intermediate coupling means and to form a second disc pack having a closed-shaped hub portion which is located between the intermediate and the second coupling means, each disc-like coupling element overlying another disc-like coupling element of one of the disc packs such that the attachment means of each disc-like coupling element are substantially aligned with the attachment means of another disc-like coupling element.

26. The flexible coupling of claim 24 further comprising a plurality of disc-like coupling elements which are assembled to form a first disc pack having an open-shaped hub portion which is located between the first and the intermediate coupling means and to form a second disc pack having an open-shaped hub portion which is located between the intermediate and the second coupling means, each disc-like coupling element overlying another disc-like coupling element of one of the disc packs such that the attachment means of each disc-like coupling element are substantially aligned with the attachment means of another disc-like coupling element.

27. The flexible coupling of claim 24 wherein the intermediate coupling means further includes third and fourth mounting mechanisms located radially from the axis of rotation and wherein the disc-like coupling elements are connected in an operational configuration to the first, second and intermediate coupling means such that:
 (a) both arms of a first lobe of the first disc-like coupling element are connected respectively to the first and second mounting mechanisms of the first coupling means;
 (b) both arms of a second lobe of the first disc-like coupling element are connected respectively to the first and second mounting mechanisms of the intermediate coupling means;
 (c) both arms of a first lobe of the second disc-like coupling element are connected respectively to the first and second mounting mechanisms of the second coupling means; and
 (d) both arms of a second lobe of the second disc-like coupling element are connected respectively to the third and fourth mounting mechanisms of the intermediate coupling means.

28. The flexible coupling of claim 24 wherein the disc-like coupling elements are connected in an operational configuration to the first, second and intermediate coupling means such that:
 (a) one arm of a particular lobe of the first disc-like coupling element is connected to the first mounting mechanism of the first coupling means;
 (b) the other arm of the particular lobe of the first disc-like coupling element is connected to the first mounting mechanism of the intermediate coupling means;
 (c) one arm of a particular lobe of the second disc-like coupling element is connected to the first mounting mechanism of the second coupling means; and
 (d) the other arm of the particular lobe of the second disc-like coupling element is connected to the second mounting mechanism of the intermediate coupling means.

29. The flexible coupling of claim 24 wherein the intermediate coupling means further includes third and fourth mounting mechanisms located radially from the axis of rotation and wherein the disc-like coupling elements are connected in an operational configuration to the first, second and intermediate coupling means such that:
 (a) one arm of a first lobe of the first disc-like coupling element is connected to the mounting mechanism of the first coupling means;
 (b) the other arm of the first lobe of the first disc-like coupling element is connected to the third mounting mechanism of the intermediate coupling means;
 (c) one arm of a second lobe of the first disc-like coupling element is connected to the second mounting mechanism of the first coupling means;
 (d) the other arm of the second lobe of the first disc-like coupling element is connected to the first mounting mechanism of the intermediate coupling means;
 (e) one arm of a first lobe of the second disc-like coupling element is connected to the first mounting mechanism of the second coupling means;
 (f) the other arm of the first lobe of the second disc-like coupling element is connected to the fourth mounting mechanism of the intermediate coupling means;
 (g) one arm of a second lobe of the second disc-like coupling element is connected to the second mounting mechanism of the second coupling means; and
 (h) the other arm of the second lobe of the second disc-like coupling element is connected to the second mounting mechanism of the intermediate coupling means.

30. The flexible coupling of claim 24 wherein the arms of the lobes of at least one flexible disc-like coupling element are connected to at least two of the coupling means through unidirectional torque loading such that the lobes are in tension whenever the first and second coupling means are attached to the driving and driven shafts of the drive train apparatus, respectively, the first flexible disc-like coupling element is attached to the first and the intermediate coupling means, the second disc-like coupling element is attached to the intermediate and the second coupling means, and the driving shaft is driving the driven shaft.

31. The flexible coupling of claim 30 wherein the unidirectional torque loading is in the direction that reduces the torque stress during utilization of the flexible coupling.

32. The flexible coupling of claim 24 wherein the one disc-like coupling element is mounted to at least two of the coupling means such that the disc-like coupling element is pre-stressed, thereby enabling a reduction in the torque stress whenever the first and second coupling means are attached to the driving and driven shafts of the drive train apparatus, respectively, the first flexible disc-like coupling element is attached to the first and the intermediate coupling means, the second flexible disc-like coupling element is attached to the intermediate and the second coupling means, and the driving shaft is driving the driven shaft.

* * * * *

UNITED STATES PATENT AND TRADEMARK OFFICE
CERTIFICATE OF CORRECTION

PATENT NO. : 5,221,232

DATED : June 22, 1993

INVENTOR(S) : Nameny

It is certified that error appears in the above-identified patent and that said Letters Patent is hereby corrected as shown below:

Title page, item [75] Inventors: "Stanchfield" should read --Staunchfield--.

Col. 32, line 42, "radically" should read --radially--.

Col. 34, line 13, insert --first-- after the word "the".

Col. 34, line 56, "the" should read --at least--.

Signed and Sealed this

Eighth Day of February, 1994

Attest:

BRUCE LEHMAN

Attesting Officer

Commissioner of Patents and Trademarks